(12) United States Patent
Dellevigne et al.

(10) Patent No.: US 10,943,513 B2
(45) Date of Patent: Mar. 9, 2021

(54) FIXING WRAP-AROUND LABELS WITH LED-CURABLE ADHESIVES

(71) Applicant: PepsiCo, Inc., Purchase, NY (US)

(72) Inventors: Laura A. Dellevigne, Danbury, CT (US); Bruno Telesca, Hawthorne, NY (US); Mikhail Laksin, Boonton, NJ (US); James A. Stevenson, Pittsburgh, PA (US); Paul J. Donnelly, New Fairfield, CT (US); Marc T. Wiescinski, Chicago, IL (US); Brijesh K. Nigam, Naperville, IL (US)

(73) Assignee: PepsiCo, Inc., Purchase, NY (US)

( * ) Notice: Subject to any disclaimer, the term of this patent is extended or adjusted under 35 U.S.C. 154(b) by 103 days.

(21) Appl. No.: 15/650,279

(22) Filed: Jul. 14, 2017

(65) Prior Publication Data
US 2018/0018906 A1 Jan. 18, 2018

Related U.S. Application Data

(60) Provisional application No. 62/461,481, filed on Feb. 21, 2017, provisional application No. 62/363,090, filed on Jul. 15, 2016.

(51) Int. Cl.
*G09F 3/10* (2006.01)
*G09F 3/00* (2006.01)
(Continued)

(52) U.S. Cl.
CPC ............... *G09F 3/10* (2013.01); *B32B 37/12* (2013.01); *B65D 23/0878* (2013.01);
(Continued)

(58) Field of Classification Search
CPC .......... G09F 3/10; G09F 3/029; G09F 3/0291; B32B 37/12; B65D 23/0878
See application file for complete search history.

(56) References Cited

U.S. PATENT DOCUMENTS 5,567,511 A    10/1996   Shih et al.
7,074,295 B2 *   7/2006   Bellafore ................. B65C 3/16
                                             156/275.7
(Continued)

FOREIGN PATENT DOCUMENTS

CN          85101569 A     1/1987
CN          85101776 A     1/1987
(Continued)

OTHER PUBLICATIONS

DE102012200831A1 abstract translation (Year: 2013).*
(Continued)

*Primary Examiner* — Jeffry H Aftergut
*Assistant Examiner* — Jaeyun Lee
(74) *Attorney, Agent, or Firm* — Sterne, Kessler, Goldstein & Fox P.L.L.C.

(57) ABSTRACT

Provided herewith are methods of preparing a labeled article comprising curing an LED-curable adhesive on a film label such as a shrink film label, wherein at least portions of the LED-curable adhesive are disposed in the overlap formed between a leading edge and trailing edge of the film label. The curing can be conducted at a temperature below 70° C. and is suitable for labeling 500-720 articles per minute in a sequential manner. Also provided herewith are apparatus for labeling articles with film labels, such as shrink film labels comprising an LED station. Further, a method of retrofitting an existing hot-melt labeling system for use in labeling articles with film labels such as shrink film labels is also provided.

33 Claims, 10 Drawing Sheets

(51) Int. Cl.
    *B32B 37/12*     (2006.01)
    *B65D 23/08*     (2006.01)
    *G09F 3/02*     (2006.01)

(52) U.S. Cl.
    CPC ...... *G09F 3/0291* (2013.01); *B32B 2307/736* (2013.01); *B32B 2439/60* (2013.01); *G09F 2003/023* (2013.01); *G09F 2003/0251* (2013.01); *G09F 2003/0273* (2013.01)

(56) References Cited

U.S. PATENT DOCUMENTS

| | | | |
|---|---|---|---|
| 2005/0020745 A1* | 1/2005 | Runacre | C09D 4/00 |
| | | | 524/394 |
| 2007/0029036 A1* | 2/2007 | Fort | B65C 9/2208 |
| | | | 156/291 |
| 2012/0318193 A1 | 12/2012 | Specht | |
| 2016/0217712 A1* | 7/2016 | Stevenson | G09F 3/02 |

FOREIGN PATENT DOCUMENTS

| | | | | |
|---|---|---|---|---|
| DE | 102009031479 A1 * | 1/2011 | ............... | B65C 9/20 |
| DE | 102012200831 A1 * | 7/2013 | ............... | G09F 3/10 |
| EP | 2 269 911 A2 | 1/2011 | | |

OTHER PUBLICATIONS

DE 102009031479A1 detailed description translation (Year: 2011).*
International Search Report and Written Opinion of the International Searching Authority issued in International Application No. PCT/US17/42218 dated Oct. 4, 2017.

* cited by examiner

FIXING WRAP-AROUND LABELS WITH LED-CURABLE ADHESIVES

CROSS-REFERENCES TO RELATED APPLICATIONS

This application claims benefit under 35 U.S.C. § 119(e) of U.S. Provisional Patent Application No. 62/363,090, filed Jul. 15, 2016, and U.S. Provisional Application No. 62/461,481, filed Feb. 21, 2017, each of which is incorporated herein in its entirety by reference thereto.

FIELD AND BACKGROUND

The present disclosure is generally related to labeling an article with a film label such as a shrink film label. Shrink film labels have been described as useful for labeling articles that have irregularity in shape. See e.g., U.S. Pat. No. 4,923,557. Exemplary shrink film labels have been described, for example, in U.S. Pat. No. 7,935,401.

BRIEF SUMMARY

In various embodiments, a method of preparing a film labeled article is provided. In any of the embodiments described herein, the film label can be a shrink film label. In some embodiments, the method comprises curing a light emitting diodes (herein after "LED") curable adhesive on a shrink film label. In some embodiments, at least portions of the LED-curable adhesive are disposed in the overlap formed between a leading edge and trailing edge of the shrink film label. In some embodiments, the curing is conducted at a temperature below 70° C. In some embodiments, the curing is suitable for labeling up to 720 (e.g., 500-720) articles per minute in a sequential manner.

In some embodiments, the method comprises a) providing an article to be labeled; b) providing a film label (e.g., shrink film label) having a leading edge and a trailing edge; c) applying an LED-curable adhesive on at least a portion of the shrink film label; d) wrapping the film label (e.g., shrink film label) around the article to be labeled such that the leading and trailing edges of the film label (e.g., shrink film label) overlap, wherein at least portions of the LED-curable adhesive are disposed in the overlap between the leading and trailing edges; and e) curing the LED-curable adhesive disposed in the overlap between the leading and trailing edges with LED. In some embodiments, the film label is sufficiently transparent to LED light to allow curing of the LED-curable adhesive disposed in the overlap between the leading and trailing edges with LED in embodiments described herein. In some embodiments, the film label is a shrink film label. In some embodiments, the method further comprises a step f) passing the wrapped article from step e) through a shrink tunnel to form a shrink labeled article. In some embodiments, the article to be labeled is characterized by a body comprising at least two parts (e.g., cylindrical or non-cylindrical such as dogbone, hourglass, or biconic) having different diameters or dimensions. In some embodiments, the film label (e.g., shrink film label) wraps at least a portion of the article to be labeled between and including the two different parts having different diameters or dimensions.

Adhesives can be applied on the film label (e.g., shrink film label) in various ways. In some embodiments, the LED-curable adhesive is applied near the trailing edge of the film label. In some embodiments, a leading edge adhesive is applied near the leading edge of the film label. In some embodiments, the leading edge adhesive is not LED curable. In some embodiments, the leading edge is adhered to the article to be labeled by the leading edge adhesive prior to wrapping. In some embodiments, the leading edge adhesive is applied to the film label. In some embodiments, the leading edge adhesive is applied directly to the article to be labeled. In some embodiments, at least portions of the leading edge adhesive (e.g., LED-curable adhesive) is disposed between the article to be labeled and the leading edge, and the method further comprises curing the leading edge adhesive disposed between the article to be labeled and the leading edge. In some embodiments, the leading edge adhesive (e.g., LED-curable adhesive) disposed between the article to be labeled and the leading edge is cured before curing the LED-curable adhesive disposed in the overlap between the leading and trailing edges. In some embodiments, the leading edge adhesive (e.g., LED-curable adhesive) disposed between the article to be labeled and the leading edge is cured about the same time (e.g., within 0 to 10 seconds apart, within one second or within half a second) as curing the LED-curable adhesive disposed in the overlap between the leading and trailing edges.

Various amounts of adhesives can be applied on the film label (e.g., shrink film label). In some embodiments, the LED-curable adhesive is applied on the film label in an amount of 5 g/m$^2$ to 30 g/m$^2$ (e.g., 10 g/m$^2$ to 30 g/m$^2$). Other suitable amounts may be used.

Curing of the LED-curable adhesive can be done under various conditions. In some embodiments, the curing comprises subjecting the article to be labeled to LED light at a wavelength of between 365 nm and 420 nm (e.g.; 385 nm to 405 nm). In some embodiments; the curing is conducted at a temperature below 70° C. (e.g., below 50° C.). In any of the embodiments described herein, the curing is suitable for labeling 500-720 articles per minute in a sequential manner. Other suitable curing conditions may be used.

Various LED-curable adhesives can be used in the methods described herein. In some embodiments, the LED-curable adhesives is a mixture of ethylenically unsaturated pre-polymers, ethylenically unsaturated oligomers, ethylenically unsaturated monomers, photoinitiators with light absorptivity in close proximity and within LED range of 365 nm to 405 nm, and optionally one or more inert, compatible fillers. In some embodiments, the LED-curable adhesive is a mixture of acrylate or methacrylate functional polyurethane, acrylate or methacrylate functional monomer, phosphine oxide type photoinitiator with light absorptivity in close proximity and within LED range of 365 nm to 405 nm, and optionally one or more inert compatible fillers, wherein the one or more inert fillers are hydrocarbon resins, rosin esters, polyamides, polyesters or a combination thereof. Other suitable LED-curable adhesives may be used.

In various embodiments, an apparatus for labeling an article with a film label (e.g., shrink film label) is provided. In some embodiments, the apparatus comprises a) an infeed unit configured to feed the articles to be labeled; b) a label feeder configured to feed the film label; c) an LED adhesive applicator configured to apply an LED-curable adhesive on the film label; d) a mechanism to deliver label strips of the film label to wrap the article to be labeled, wherein each label strip has a leading edge and a trailing edge; wherein upon wrapping the article to be labeled, the leading and trailing edges of the label strips of the film label overlap, wherein at least portions of the LED-curable adhesive are disposed in the overlap between the leading and trailing edges; e) an LED station comprising at least one LED lamp configured to cure the LED-curable adhesive disposed in the overlap between the leading and trailing edges; and f) an output unit configured to deliver the labeled articles. In some embodiments, the film label is shrink film label. In some embodiments, the mechanism to deliver the label strips comprises g) a cutter configured to cut the film label into label strips; and h) a vacuum drum configured to transfer each of the label strips from the cutter to wrap the article to be labeled such that the leading and trailing edges of the film label overlap, wherein at least portions of the LED-curable adhesive are disposed in the overlap between the leading and trailing edges. In some embodiments, the mechanism to deliver the label strips is a stack feed. In some embodiments, the stack feed is a magazine comprising pre-cut label strips of the film label. In some embodiments, the film labd is shrink film label and the apparatus further comprises a shrink tunnel configured to shrink the shrink film label over the article to be labeled. In some embodiments, the LED adhesive applicator is configured to apply the LED-curable adhesive near the trailing edge of the film label. In some embodiments, the apparatus further comprises a leading edge adhesive applicator configured to apply a leading edge adhesive near the leading edge of the film label. In some embodiments, the leading edge adhesive is applied in a way that that the leading edge of the label is fastened to the article to be labeled. In some embodiments, the apparatus further comprises a wiper configured to wipe the trailing edge against the article to be labeled to spread the adhesives disposed between the trailing edge and the leading edge, between the trailing edge and the article to be labeled, or both. In some embodiments, the wiper is a brush, a sponge roller, or a sponge pad. In some embodiments, the at least one LED lamp is configured to emit light at a wavelength of between 365 nm and 420 nm (e.g., 385 nm to 405 nm).

In some embodiments, the apparatus described herein can be prepared by retrofitting an existing hot-melt labeling system. In some embodiments, the retrofit labeling system comprises an LED station. In some embodiments, the retrofit labeling system further comprise an additional adhesive applicator.

In some embodiments, a retrofit labeling system for use in labeling an article with a film label (e.g., shrink film label) is provided. In some embodiments, the retrofit labeling system is retrofitted with an existing hot-melt labeling system, wherein the existing hot-melt labeling system includes an infeed unit configured to feed the articles to be labeled; a label feeder configured to feed the film label; a hot-melt adhesive applicator; a cutter; a vacuum drum; and an output unit configured to deliver the labeled articles. In some embodiments, the retrofit labeling system comprises an LED station comprising at least one LED lamp. In some embodiments, the hot-melt adhesive applicator is configured to apply an LED-curable adhesive on the film label. In some embodiments, the cutter is configured to cut the film label (e.g., shrink film label) into label strips each having a leading edge and a trailing edge. In some embodiments, the vacuum drum is configured to transfer each of the label strips from the cutter to wrap the article to be labeled such that the leading and trailing edges of the film label (e.g., shrink film label) overlap, wherein at least portions of the LED-curable adhesive are disposed in the overlap between the leading and trailing edges. In some embodiments, the station is configured to cure the LED-curable adhesive disposed in the overlap between the leading and trailing edges. In some embodiments, the film label is shrink film label and the retrofit labeling system further comprises a shrink tunnel configured to shrink the shrink film label over the article to be labeled.

The apparatus described herein can be configured to produce various labeled articles at various speeds. In some embodiments, the article to be labeled is characterized by a body comprising at least two different parts having different diameters or dimensions. In some embodiments, the apparatus can be configured to label up to 720 articles (e.g., 500-720) articles per minute in a sequential manner. Other suitable articles to be labeled and speeds may be used.

In some embodiments, a method of retrofitting a labeling system for use in labeling an article with a film label (e.g., shrink film label) is provided. In some embodiments, the method comprises providing an existing hot-melt labeling system comprising an infeed unit configured to feed the articles to be labeled; a label feeder configured to feed the shrink film label; a hot-melt adhesive applicator; a cutter; a heater configured to heat a hot-melt adhesive; a vacuum drum; and an output unit configured to deliver the labeled articles. In some embodiments, the method comprises removing the heater from the hot-melt labeling system. In some embodiments, the method comprises adding an LED station comprising at least one LED lamp. In some embodiments, the hot-melt adhesive applicator is configured to apply an LED-curable adhesive on the shrink film label. In some embodiments, the cutter is configured to cut the film label (e.g., shrink film label) into label strips each having a leading edge and a trailing edge. In some embodiments, the vacuum drum is configured to transfer each of the label strips from the cutter to wrap the article to be labeled such that the leading and trailing edges of the film label (e.g., shrink film label) overlap, wherein at least portions of the LED-curable adhesive are disposed in the overlap between the leading and trailing edges. In some embodiments, the LED station is configured to cure the LED-curable adhesive disposed in the overlap between the leading and trailing edges. In some embodiments, the film label is shrink film label and the method further comprises connecting the output unit to a shrink tunnel, wherein the output unit is configured to deliver the labeled articles to the shrink tunnel to shrink the shrink film label over the article to be labeled. In some embodiments, the method further comprises configuring the adhesive hot-melt applicator to apply the LED-curable adhesive near the trailing edge of the film label. In some embodiments, the method further comprises adding a leading edge adhesive applicator configured to apply a leading edge adhesive near the leading edge of the film label. In some embodiments, the leading edge adhesive is applied such that at least portions of the leading edge adhesive is disposed between the leading edge of the label and the article to be labeled.

In some embodiments, the film label is a non-shrink film label. In some embodiments, the film label is a clear label, for example a clear polypropylene label. In some embodiments, the article has a cylindrical portion and the film label is wrapped around the cylindrical portion of the article. In some embodiments, the article is a beverage container, for example, a beverage container suitable for a carbonated beverage.

In some embodiments, the LED-curable adhesive has a tack force of at least 5 N. In some embodiments, the LED-curable adhesive has a viscosity of at least 2 Pas at 25° C. in some embodiments, the leading edge adhesive is an LED-curable adhesive. In some embodiments, the leading edge adhesive is applied at a temperature below 70° C., for example, at a temperature below 50° C.

BRIEF DESCRIPTION OF THE FIGURES

The foregoing summary, as well as the following detailed description of the embodiments, will be better understood when read in conjunction with the appended figures. For the purpose of illustration, the figures may describe the use of specific embodiments. It should be understood, however, that the apparatus, systems, and methods described herein are not limited to the precise embodiments discussed or described in the figures.

FIG. 2A also shows curing the strip of adhesive near the trailing edge by LED light. In FIG. 2D, the touch points are not in the same plane or that the shape is convex.

In FIG. 3A, the leading edge adhesives (pickup adhesive) are applied to the film label (e.g., shrink film label) through an adhesive gun 307A and the trailing edge adhesives (lap adhesive) are applied to the film label (e.g., shrink film label) through a roller 307.

In FIG. 3B, the leading edge adhesives (pickup adhesive) are applied to the bottle through an adhesive gun and the trailing edge adhesives (lap adhesive) are applied to the film label (e.g., shrink film label) through a roller.

In FIG. 3C, the leading edge adhesives (pickup adhesive) are applied to the bottle through an adhesive gun and the trailing edge adhesives (lap adhesive) are applied to the film label (e.g., shrink film label) also through an adhesive gun.

In FIG. 3D, the leading edge adhesives (pickup adhesive) are applied to the film label (e.g., shrink film label) through an adhesive gun and the trailing edge adhesives (lap adhesive) are applied to the film label (e.g., shrink film label) also through an adhesive gun.

In FIG. 3E, the leading edge adhesives (pickup adhesive) are applied to the film label (e.g., shrink film label) through a roller and the trailing edge adhesives (lap adhesive) are applied to the film label (e.g., shrink film label) also through a roller. Optionally, an LED station is installed near the point of application to cure the leading edge adhesives.

DETAILED DESCRIPTION

Definitions

Open terms such as "include," "including," "contain," "containing" and the like mean "comprising." These open-ended transitional phrases are used to introduce an open ended list of elements, method steps or the like that does not exclude additional, unrecited elements or method steps.

The transitional phrase "consisting of" and variations thereof excludes any element, step, or ingredient not recited, except for impurities ordinarily associated therewith.

The transitional phrase "consists essentially of," or variations such as "consist essentially of" or "consisting essentially of," excludes any element, step, or ingredient not recited except for those that do not materially change the basic or novel properties of the specified method, structure or composition.

Also, the indefinite articles "a" and "an" preceding an element or component of the invention are intended to be nonrestrictive regarding the number of instances, i.e., occurrences of the element or component. Therefore "a" or "an" should be read to include one or at least one, and the singular word form of the element or component also includes the plural unless the number is obviously meant to be singular.

The terms "invention" or "present invention" as used herein are non-limiting terms and are not intended to limit claim scope.

As used herein, the term "film label" may include either a shrink film label or a non-shrink film label.

Figure 1B:
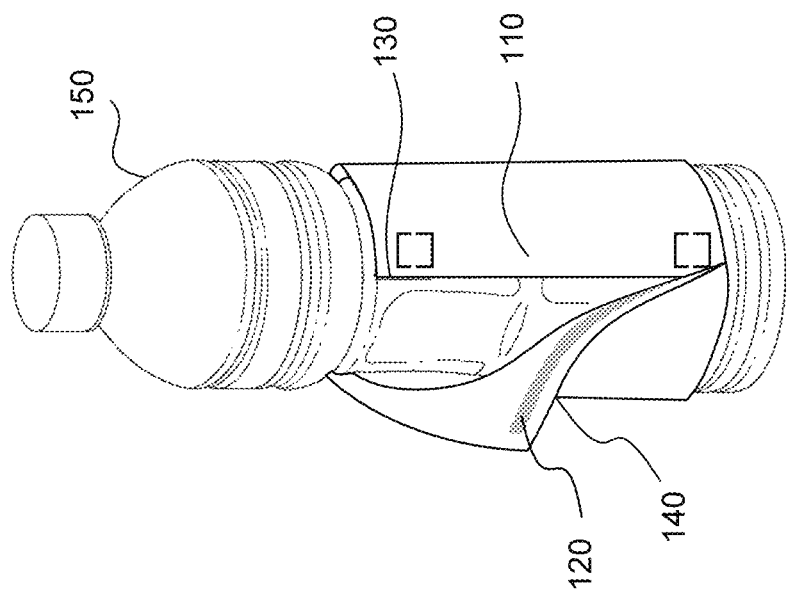
FIG. 1B shows a film label (e.g., shrink film label) attached to a bottle, with the adhesive near the leading edge in direct contact with the bottle.
Figure 1A:
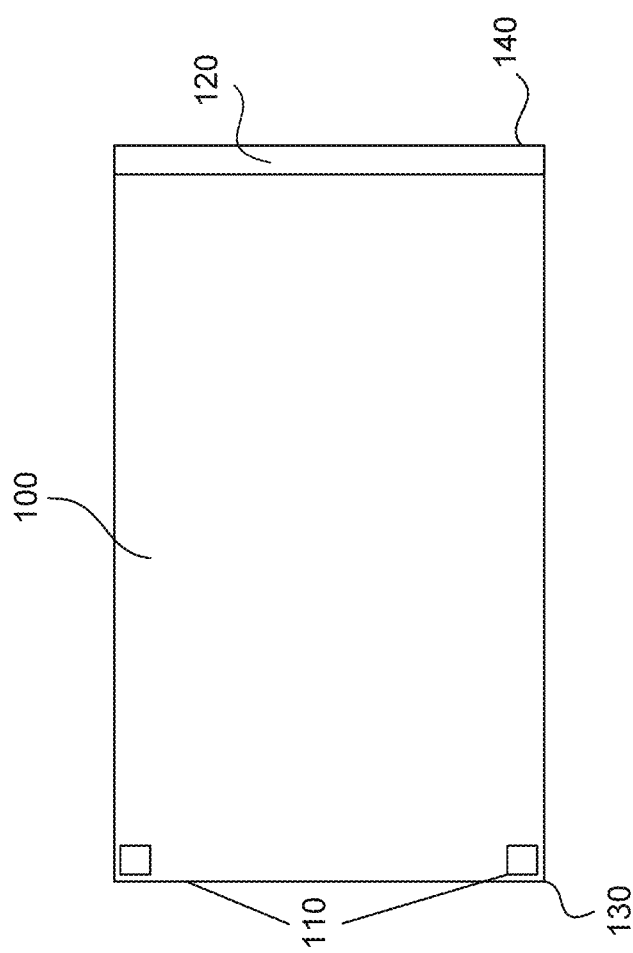
FIG. 1A shows a film label (e.g., shrink film label) with adhesives applied near the leading edge and trailing edge of the film, with the strip near the trailing edge being an LED-curable adhesive.

As used herein, the term "leading edge" of a film label (e.g., shrink film label) refers to the edge of the label which first comes in contact with an article to be labeled, whereas the "trailing edge" of the film label (e.g., shrink film label) refers to the opposite edge of the label. As used herein, "near" the leading edge or trailing edge means within a centimeter (e.g., within 0.5 cm, within 0.25 cm, or within 1 mm) from the leading edge or trailing edge and includes touching the leading edge or trailing edge. In any of the embodiments described herein, "near" the leading edge or trailing edge can be within 1 mm the leading edge or trailing edge and include touching the leading edge or trailing edge. As shown in FIG. 1A, the film label 100 (e.g., shrink film label) is of a rectangle shape, with two edges 130 and 140. In some embodiments, two areas of adhesive 110 and 120 can be applied near the edges 130 and 140, on the same face of the label. These areas may be any suitable geometry. As illustrated, area 120 is a strip, and area 110 is two spots of adhesive. In some embodiments, adhesive 110 can be applied near edge 130 as two spots, for example, as shown in FIG. 1A. Depending on which edge first comes in contact with an article to be labeled, either edge can be a leading edge. In FIG. 1B, edge 130 first comes in contact with bottle 150, and therefore 130 is the leading edge, and the opposite edge 140 is the trailing edge. As shown in FIG. 1B, the adhesive applied near the leading edge, which is the leading edge adhesive, attaches the film label such as shrink film label to the bottle 150. The bottle 150 in a labeling machine can move in a direction relative to how the film label (e.g., shrink film label) moves such that the film label wraps around the bottle 150 so that the strip of adhesive 120 near the trailing edge overlaps with the leading edge 130 to form a seamed sleeve. For example, in some embodiments, the bottle moves clockwise and the film label moves counter-clockwise or vice versa so that the film label wraps around the bottle. Five layers may be formed after the film label wraps the bottle: from inner to the outer, the bottle, the leading edge adhesive (pickup adhesive), the leading edge, the trailing edge adhesive (lap adhesive), and the trailing edge. This can be further shown in FIG. 2A, where the strip of adhesive 120 is disposed in between the overlap formed from the leading and trailing edges which can be cured by LED light 160.

Figure 2B:
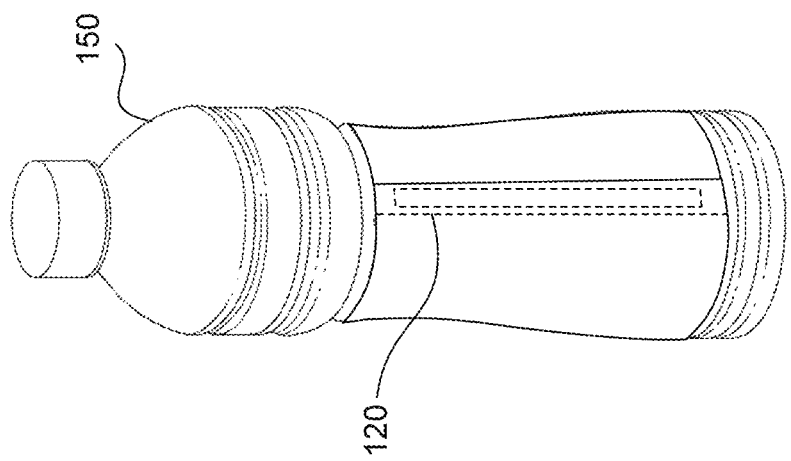
FIG. 2B shows the film label (in this figure a shrink film label) wrapped bottle after being exposed to heat.
Figure 2A:
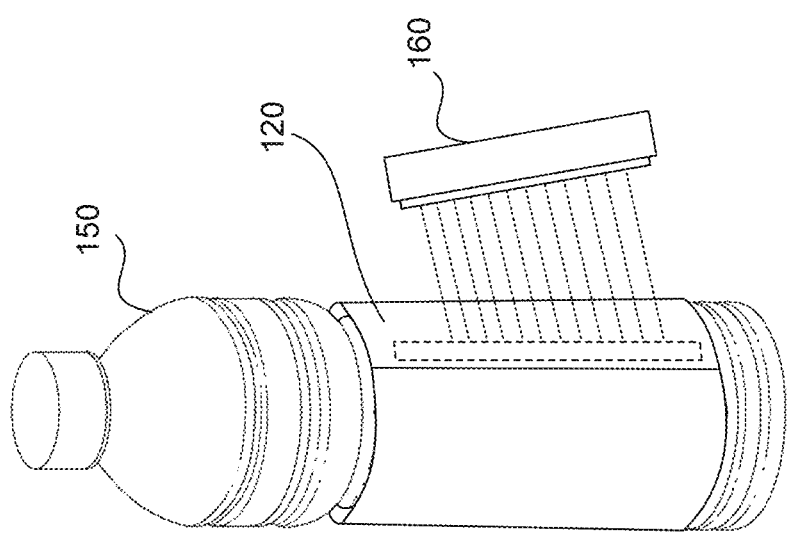
FIG. 2A show a film label (e.g., shrink film label) attached to a bottle, with the areas of adhesive near the leading edge in direct contact with the bottle, and the adhesive near the trailing edge overlapping the leading edge.

As used herein, the terms "shrink film label" generally refers to a material that can shrink over the article it is covering upon heat, for example, by passing through a shrink tunnel at a temperature of 100° C. or lower. FIG. 2B shows a bottle where the shrink film label is wrapped over the shaped bottle after being exposed to heat.

LED Curing Apparatus and Process

It is challenging to create a seamed shrink film label or roll-fed shrink film label seam that can hold up to shrink tunnel temperatures and environments (hot air or steam). The adhesives used traditionally are hot-melts, which can cause undesirable issues when used in a shrink tunnel environment. Achieving less than 1 Pas (1000 cps) of the application viscosity while using hot-melt adhesives typically requires 140° C. or higher in melting temperature. But, shrink films generally undergo shrinkage at 100° C. or lower. Transferring adhesive at application temperature, which exceeds the film shrinkage temperature, causes premature shrinkage in the seam area. This in turn leads to defects in the label appearance such as irregularity in shape and multidirectional wrinkles. Further, when hot-melt adhesives are applied with sufficient bonding strength required for holding the label together in the shrink tunnel at 100° C. they are hard to machine and often build up on labeler and need to be cleaned only after short runs.

The present inventors have found that by using an LED-curable adhesive, better appearance of the shrink film label including the seam can be obtained when compared to traditional shrink film label processes, such as those using hot-melt adhesives. While not wishing to be bound by theories, it is believed that part of the observed enhanced effect is because LED-curable adhesives can be applied at much lower temperature than shrinkage temperature of a shrink film. LED-curable adhesives can be designed with suitable application viscosity at temperatures below 70° C. e.g., below 50° C.) and as low as 25° C. or ambient temperature. Suitable application viscosity can be about 0.3 Pas (300 cps) to about 2 Pas (2000 cps) (e.g., about 0.3 Pas (300 cps), about 0.5 Pas (500 cps), about 1 Pas (1000 cps), about 2 Pas (2000 cps), or any ranges between the specified values). In some embodiments, the suitable application viscosity can also be less than 2 Pas (2000 cps), for example, less than 1 Pas (1000 cps), or less than 0.5 Pas (500 cps). In some embodiments, the suitable application viscosity is in the range of 0.8 Pas (800 cps) to 1.5 Pas (1500 cps) (e.g., 1 Pas (1000 cps) to 1.3 Pas (1300). Because LED lamp generates minimum amount of heat and adhesive is applied at low temperature, appearance of the shrink film label can be greatly improved and defects such as wrinkles can be eliminated, when compared to traditional shrink film label processes, such as those using hot-melt adhesives. Further, because LED adhesives can undergo rapid cross-linking and polymerization upon exposure to LED light, they are much less sensitive to shrinkage temperature, providing significantly higher bonding strength in the shrink tunnel. In other words, the LED-cured adhesives do not become deformed, thereby generating a better appearance of the shrink film label, when compared to traditional shrink film label processes, such as those using hot-melt adhesives.

FIGS. 3A-3F show exemplary apparatus and process flows for labeling an article with a film label (e.g., shrink film label) using LED curing. For the discussions of the figures, the film label may be referred to as shrink film label. However, those skilled in the art would understand that the methods and apparatus described herein can also be useful for film labels other than shrink film labels.

Figure 3A:
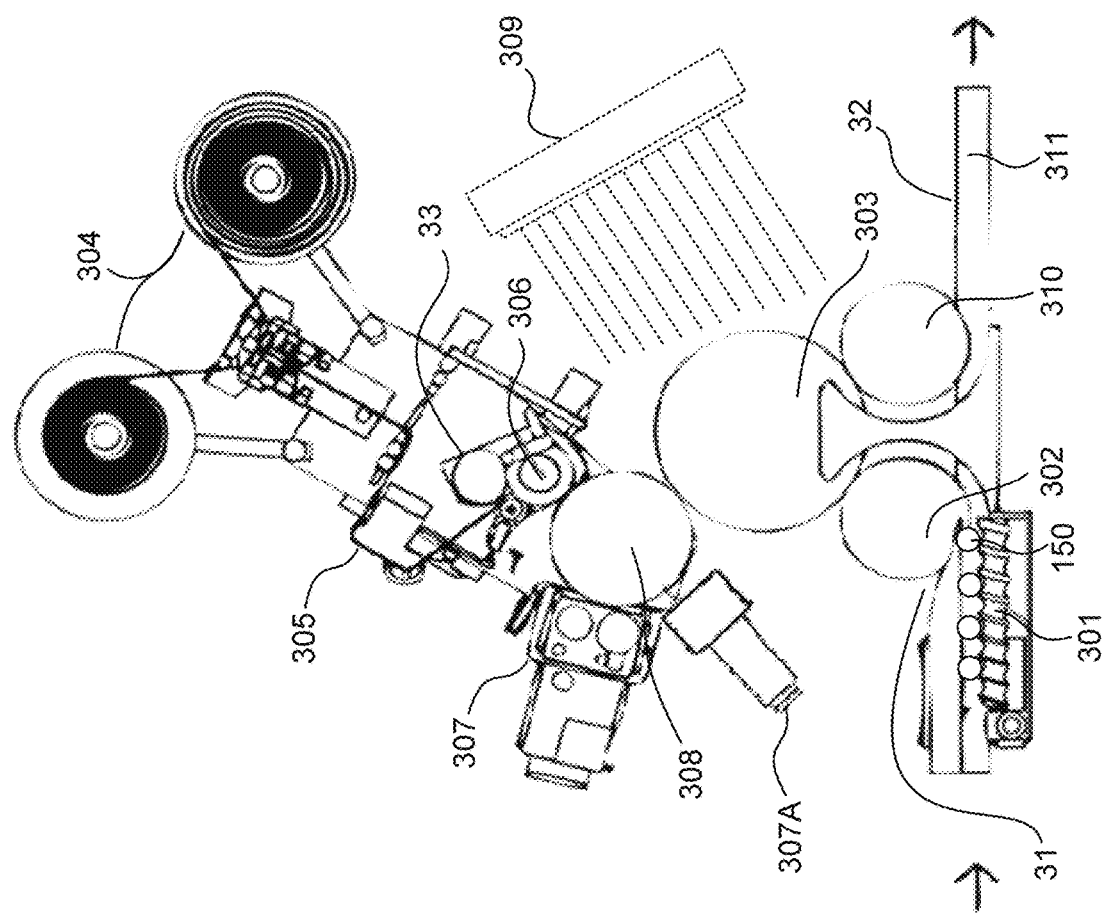
FIG. 3A shows a system for labeling articles with a film label (e.g., a shrink film label), in which an LED station is included to cure the LED-curable adhesives introduced on the film label (e.g., shrink film label).

As shown in FIG. 3A, the apparatus may include an infeed unit 31, a label feed station 33, an LED adhesive applicator 307, a cutter 306, a vacuum drum 308, an LED station 309, and an output unit 32. FIGS. 3B-3E show various alternative designs for applying the leading edge and trailing edge adhesives. FIG. 3F shows an apparatus comprising a shrink tunnel 312.

The infeed unit 31 may include a linear conveyor belt 301, a distribution wheel 302, and a container table 303. The linear conveyor belt 301 can be coupled to an Archimedes screw to distance the articles to be labeled, such as bottles 150, at an appropriate bottle spacing. The articles can then be fed into the distribution wheel 302, such as a star-wheel, rotating counter-wise with respect to the direction of rotation of the container table 303. Other designs for infeed units are known in the art, and can be used with embodiments of the invention. For example, infeed units used in methods of label handling for cut and stacked labels can also be used with certain embodiments of the invention.

The infeed unit 31 can be configured to supply various articles to be labeled. Suitable articles for use in the methods described herein include any of those known in the art. Non-limiting examples of such articles include any of those known to be labeled by traditional film labels, including shrink film labels and non-shrink film labels, such as bottles for beverages. In some embodiments, the article to be labeled is a container which can be enclosed by the film label. In other words, the film label can be used as a full-body sleeve for enclosing the container. In some embodiments, the article to be labeled is designed to provide a tamper-evident seal or packaging material (e.g., a tamper-evident band) formed by the film label. In some embodiments, the article to be labeled is a shaped and/or contoured container (e.g., an asymmetrically-shaped container). For example, the article to be labeled can contain at least two different parts that are not of the same dimensions and/or shapes. In some embodiments, the article to be labeled contains at least two parts (e.g., cylindrical parts) having different diameters or dimensions, such as the Gatorade bottles on the market. In some embodiments, the film label wraps at least a portion of the article to be labeled between and including the two different parts having different diameters or dimensions, see e.g., FIG. 2B. With reference to FIGS. 1A and 1B, adhesive 110 at the top and bottom parts of edge 130 preferably contact bottle 150 at locations that have the same bottle dimension. This preferred configuration orients the contact points where adhesive 110 is located in a line parallel to the axis of bottle 150, which facilitates film label 100 easily wrapping around bottle 150 in a cylindrical, square, polygonal or other shape such that edge 140 does not tend to translate up or down relative to edge 130 as wrapping occurs due to how edge 130 is oriented. An orienting mechanism may be used with shapes that are not rotationally symmetric to control where on bottle 150 adhesive 110 makes contact.

Figure 2C:
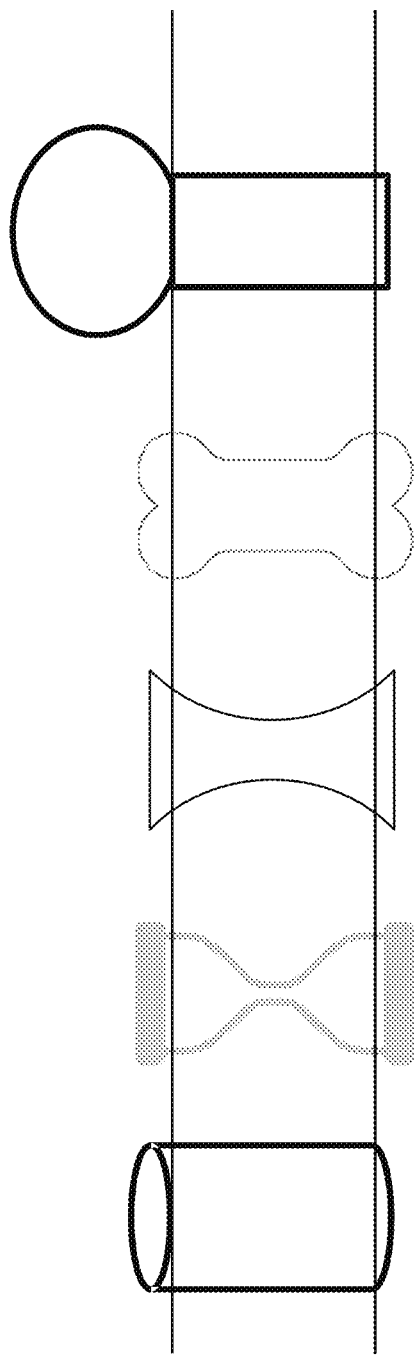
FIG. 2C shows exemplary shapes where the co-planar requirement (two co-planar touch points) is met such that the leading edge can be properly attached and secured to the article to be labeled through a leading edge adhesive.
Figure 2D:
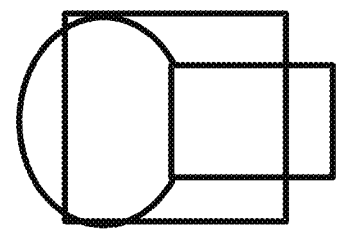
FIG. 2D shows exemplary shapes where the co-planar requirement is not met.
Figure 2D:
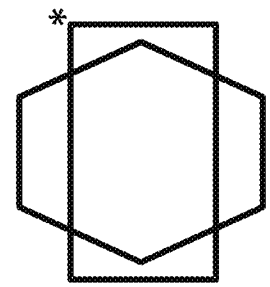
Figure 2D:
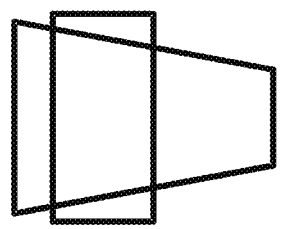
Figure 2D:
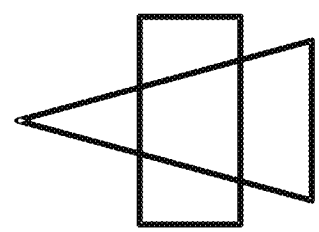

In preferred embodiments, the article to be labeled includes at least two points that are co-planar such that the leading edge of the film label can be properly attached. FIG. 2C shows various exemplary shapes including at least two co-planar touch points, which allow attaching and securing the leading edge of the film label to articles having such shapes. In comparison, FIG. 2D shows exemplary shapes wherein the potential touching points of such shapes with the film label (the rectangle box) are not in the same plane or the shapes are convex. As such, the leading edge of the film label are generally not properly attached to articles having the shapes shown in FIG. 2D.

The label teed station 33 may include a feed roller 304 and a label web guider 305. The feed roller 304, the speed of which can be adjusted according to the desired label length, continually pulls the label web from the reel. The label web guider 305, which may be installed as standard, ensures that the label web is pulled straight. Alternatively, a label feed such as a stack feed (e.g., a magazine) with pre-cut and stacked labels can also be used.

The label feed station 33 can feed various film labels (e.g., a shrink film) which can then be cut by the cutter 306. Suitable material for use as film labels (e.g., a shrink film) for the methods described herein include any of those known in the art. Film labels are generally a material made up of polymer plastic film, for example, polyolefins (e.g., polyethylene, polypropylene, etc.), polyvinyl chloride, polystyrenes, etc. Such polymers can be crosslinked or non-crosslinked. In some embodiments, the film label such as a shrink film can have a printed image applied to it, for example, by any suitable ink printing method, such as rotary screen, gravure, or flexographic techniques. In other embodiments, the film label does not have a printed image, but is suitable to have an image applied (e.g., printed) to it. Preferably, the film label has a semi-transparent layer of printing ink that can transmit sufficient amount of LED light at a wavelength of between 365 nm to 420 nm (e.g., 385 nm to 405 nm).

The cutter 306 receives labels from the label feed station and then cuts them into strips with predetermined dimensions. A computer and servo-motor can provide an exact cut-off point. The vacuum drum 308 then receives the label strips, retain them by vacuum and deliver the label strips onto the articles rotating in the container table 303. The structure and the functioning of the vacuum drum 308 is generally known and therefore it will not be described in more details.

After the shrink film labels are cut into label strips, adhesives are applied to the label strips while retained by the vacuum drum 308. The vacuum drum 308 rotates and continuously feed the label strips to the adhesive applicator(s) such as 307 so that adhesives can be applied on the label strips.

Other mechanisms for delivering label strips of the film labels can also be used for embodiments described herein. For example, in some embodiments, the pre-cut and stacked labels strips can be provided in a stack feed (e.g., a magazine) which can then be transferred to wrap the articles to be labeled. For example, the cut-and-stack labels can be individually fed and positioned to wrap the articles to be labeled. Methods of labeling articles using cut-and-stack labels are known in the art, for example, as described in U.S. Patent Application Publication No. 2010/0170618.

Various ways of applying adhesives to the label strips are suitable. For example, as shown in FIG. 1A, adhesives 110 and 120 can be applied near the edges 130 and 140. In some embodiments, adhesive 110 can be applied as two spots near the edge 130, one spot near the top and the other spot near the bottom. In some embodiments, adhesives 110 and 120 are both LED-curable adhesives. In such embodiments, the adhesives can be applied through the same applicator such as roller 307 as shown in FIG. 3A.

In some embodiments, the adhesive 110 and 120 use different types of adhesives. Depending on which edge first comes in contact with an article to be labeled, either edge can be a leading edge. In FIG. 1B, edge 130 first comes in contact with bottle 150, and therefore 130 is the leading edge, and the opposite edge 140 is the trailing edge. In some embodiments, a leading edge adhesive 110 is applied near the leading edge of the film label (e.g., shrink film label) 130 through a leading edge adhesive applicator (e.g., 307A as shown in FIG. 3A) such as a heated glue roller, or a hot-melt adhesive gun. And a strip of trailing edge adhesive 120, which is an LED-curable adhesive, is applied near the trailing edge of the film label (e.g., shrink film label) 140 through a trailing edge adhesive applicator (e.g., 307 as shown in FIG. 3A). The leading edge and trailing edge adhesives can be applied at about the same time (e.g., within 0 to 10 seconds apart, within one second or within half a second) or sequentially. In some embodiments, the leading edge adhesive is a hot-melt adhesive and the trailing edge adhesive is LED-curable adhesive. In some embodiments, both the leading edge adhesive and the trailing edge adhesive are LED-curable adhesives.

In some embodiments, the leading edge adhesive can be applied through an adhesive gun, and the trailing edge adhesive can be applied through a roller. For example, in FIG. 3A, the leading edge adhesives (pickup adhesive) are applied to the film label (e.g., shrink film label) through an adhesive gun 307A and the trailing edge adhesives (lap adhesive) are applied to the film label (e.g., shrink film label) through a roller 307. Alternatively, in FIG. 3B, the leading edge adhesives (pickup adhesive) are applied to the bottle through an adhesive gun 307A and the trailing edge adhesives (lap adhesive) are applied to the film label (e.g., shrink film label) through a roller 307.

In some embodiments, both the leading edge adhesive and the trailing edge adhesive can be applied through an adhesive gun. For example, in FIG. 3C, the leading edge adhesives (pickup adhesive) are applied to the bottle through an adhesive gun 307A and the trailing edge adhesives (lap adhesive) are applied to the film label (e.g., shrink film label) also through an adhesive gun 307B. In FIG. 3D, the leading edge adhesives (pickup adhesive) are applied to the film label (e.g., shrink film label) through an adhesive gun 307A and the trailing edge adhesives (lap adhesive) are applied to the film label (e.g., shrink film label) also through an adhesive gun 307B.

In some embodiments, both the leading edge adhesive and the trailing edge adhesive can be applied through a roller. For example, in FIG. 3E, the leading edge adhesives (pickup adhesive) are applied to the film label (e.g., shrink film label) through roller 307 and the trailing edge adhesives (lap adhesive) are applied to the film label (e.g., shrink film label) also through roller 307. In some embodiments, both the leading edge adhesives and the trailing edge adhesives are LED curable. In such embodiments, the apparatus can optionally include an LED station 320 to cure the leading edge adhesive upon application.

As shown in FIG. 1B, the adhesive applied near the leading edge, i.e., the leading edge adhesive, attaches the film label (e.g., shrink film label) to the bottle 150. The bottle 150 in a labeling machine (e.g., in a container table 303 in FIGS. 3A-3F) can move in a direction relative to how the film label (e.g., shrink film label) moves such that the film label wraps around the bottle 150 so that the strip of adhesive 120 near the trailing edge overlaps with the leading edge 130 to form a seamed sleeve. For example, in some embodiments, the bottle moves clockwise and the film label moves counterclockwise or vice versa so that the film label wraps around the bottle. Thus, at least portions of the LEU-curable adhesive are disposed in the overlap between the leading and trailing edges, which can then be cured by LED light, e.g., through the LED station 309 in FIGS. 3A-3E. See also FIG. 2A.

Figure 3B:
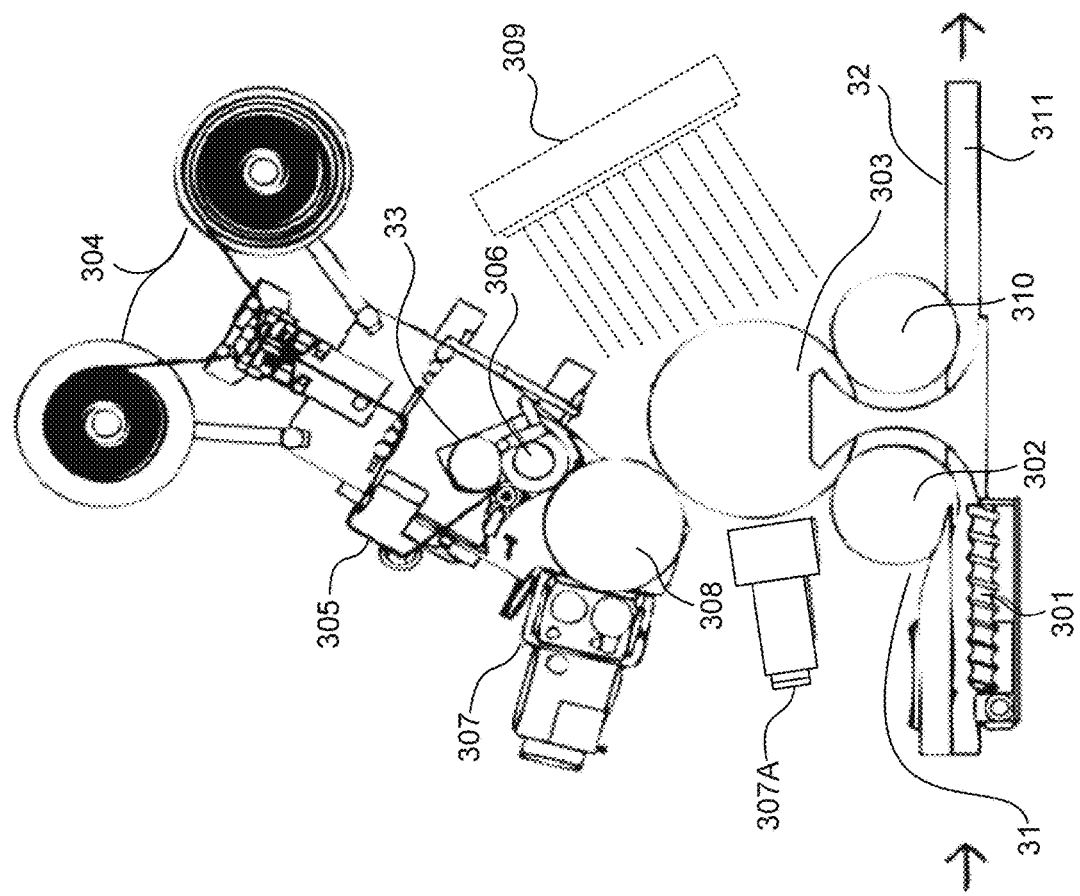
FIG. 3B shows another system for labeling articles with a film label (e.g., a shrink film label), in which an LED station is included to cure the LED-curable adhesives introduced on the film label (e.g., shrink film label).
Figure 3C:
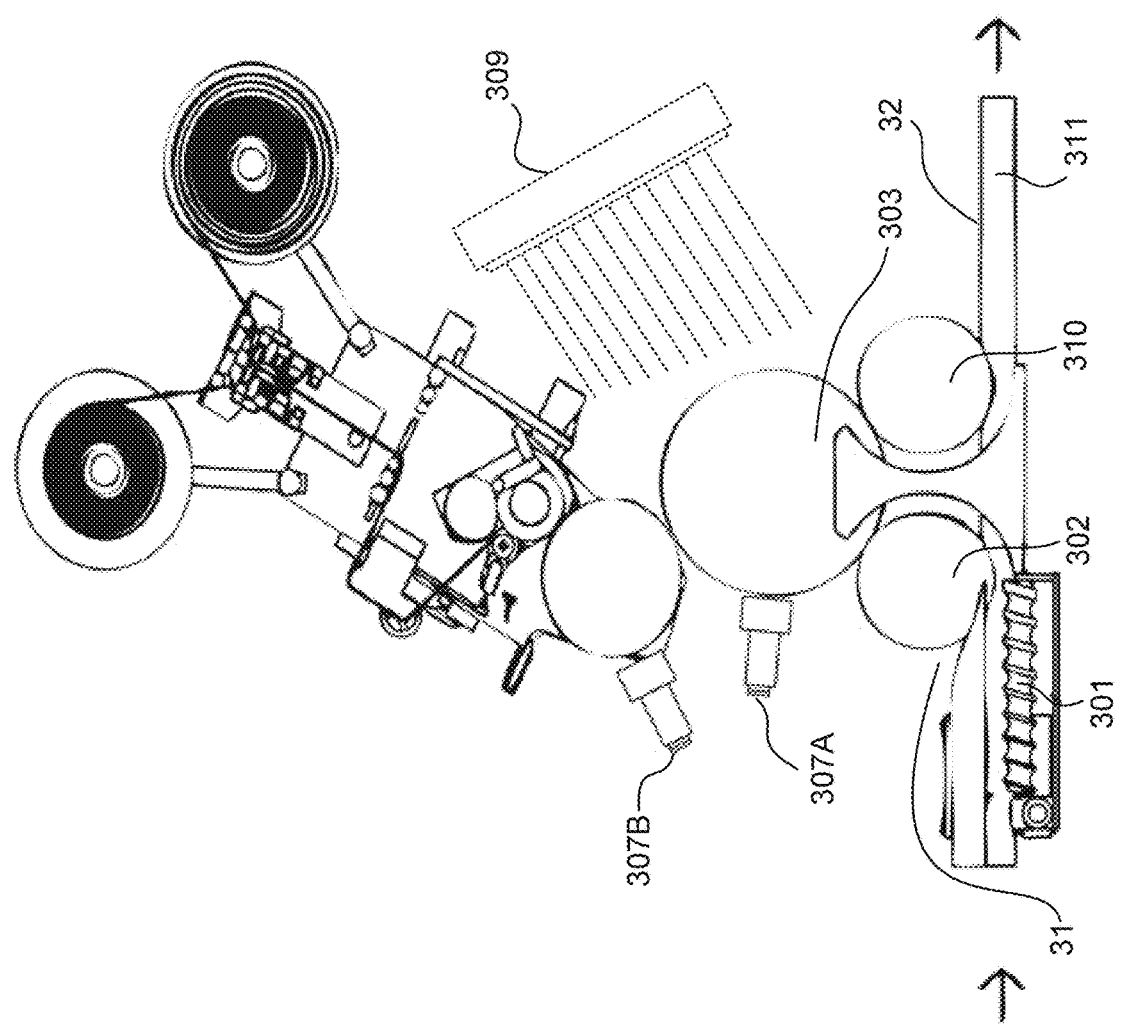
FIG. 3C shows another system for labeling articles with a film label (e.g., a shrink film label), in which an LED station is included to cure the LED-curable adhesives introduced on the film label (e.g., shrink film label).
Figure 3D:
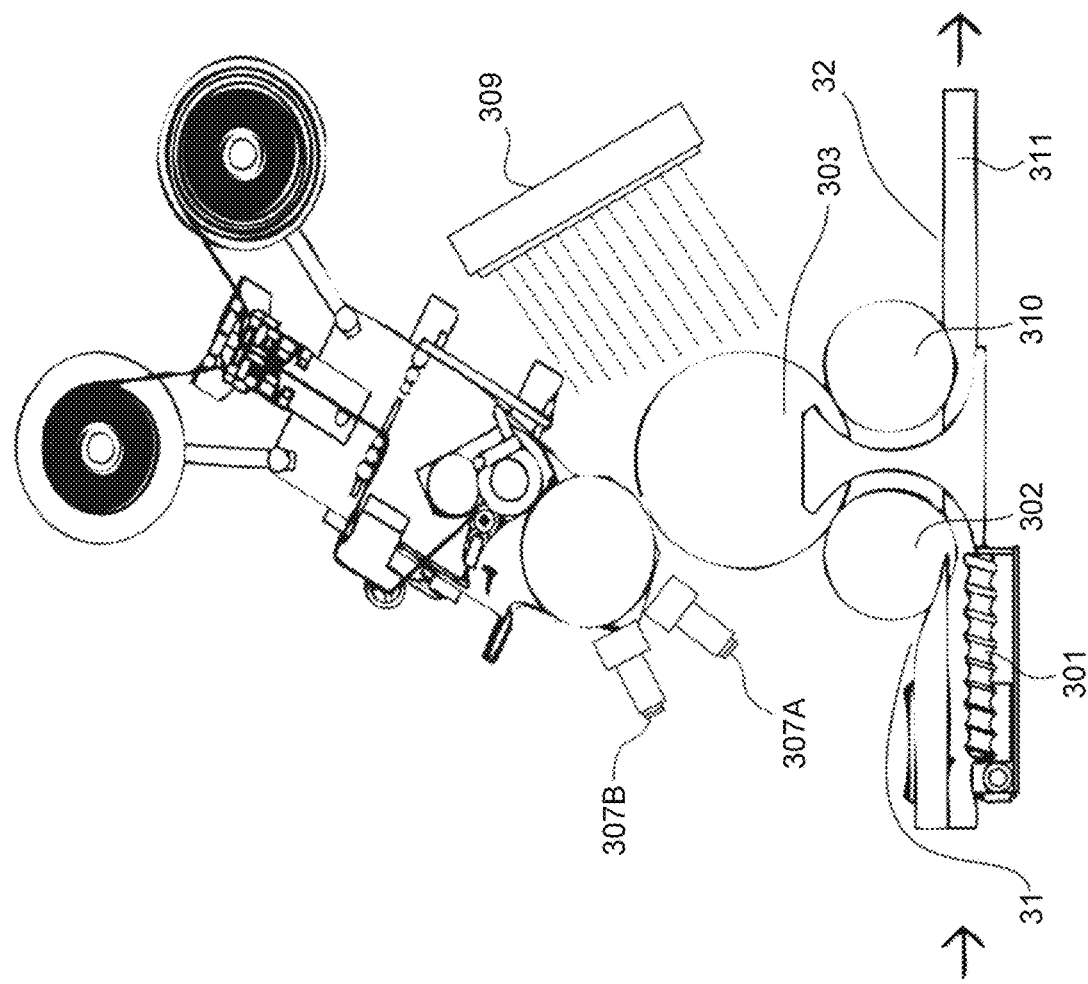
FIG. 3D shows yet another system for labeling articles with a film label (e.g., a shrink film label), in which an LED station is included to cure the LED-curable adhesives introduced on the film label (e.g., shrink film label).
Figure 3E:
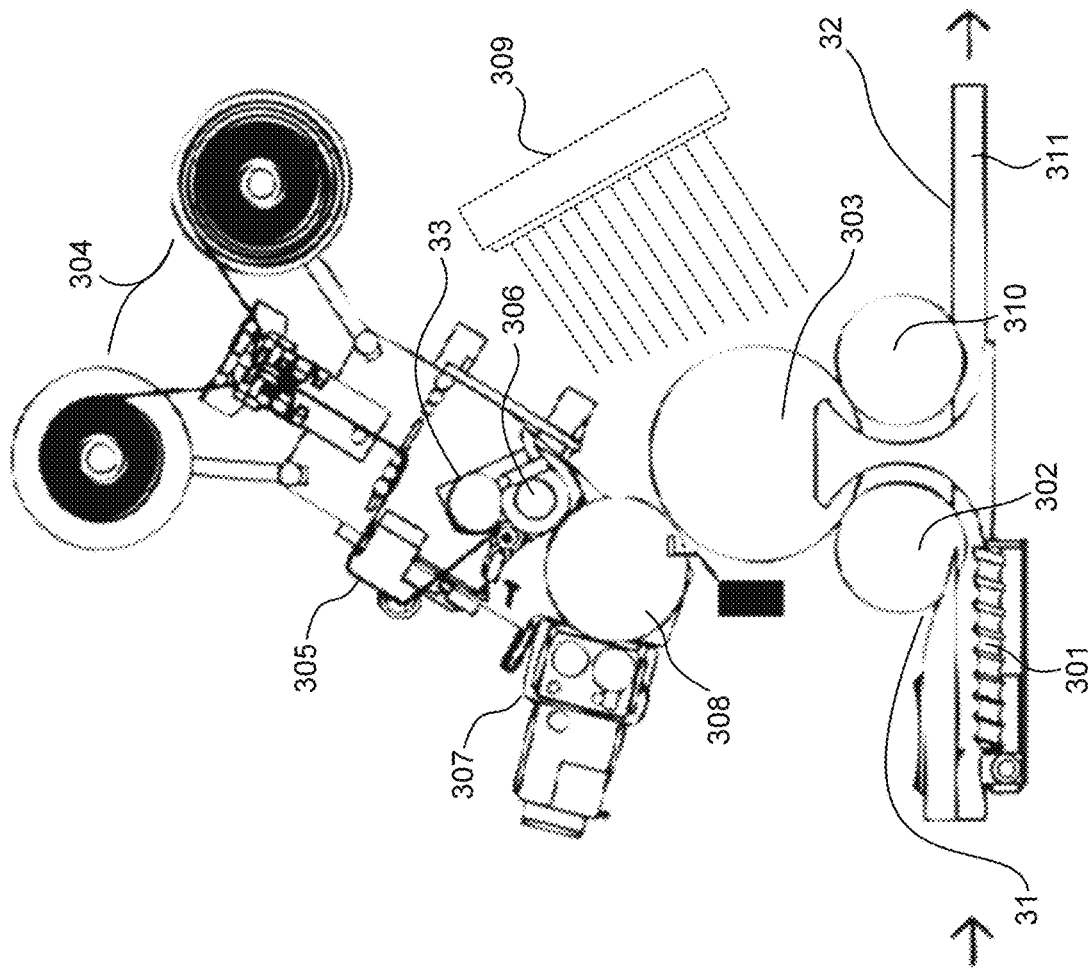
FIG. 3E shows a further system for labeling articles with a film label (e.g., a shrink film label), in which an LED station is included to cure the LED-curable adhesives introduced on the film label (e.g., shrink film label).
Figure 3F:
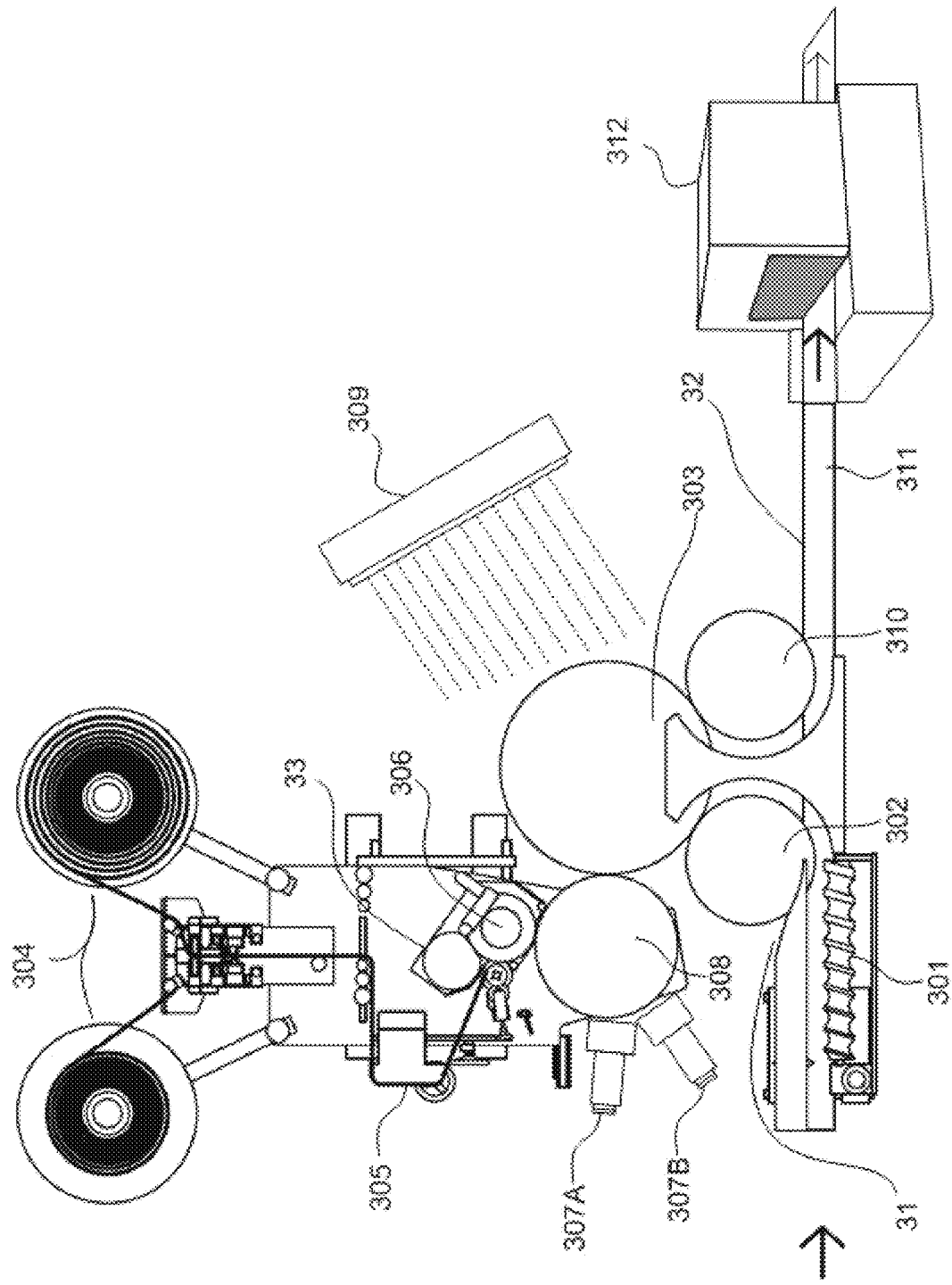
FIG. 3F shows a system for labeling articles with shrink film labels, in ich an LED station is included to cure the LED-curable adhesives introduced on the shrink film labels and a shrink tunnel is included to shrink the shrink film label to conform to the shape of the container that it surrounds.

Alternatively, as shown in FIGS. 3B and 3C, the leading edge adhesive can be applied directly to the bottle through adhesive gun 307A. In such embodiments, there is no need to apply an adhesive separately to the leading edge of the film label itself. Upon delivery, the film label is initially attached to the bottle through the leading edge adhesive applied to the bottle 150. Similarly, the bottle 150 in a labeling machine can move in a direction relative to how the film label (e.g., shrink film label) moves such that the film label wraps around the bottle 150 so that the strip of adhesive 120 near the trailing edge overlaps with the leading edge 130 to form a seamed sleeve, which can then be cured by LED light. For example, in some embodiments, the bottle moves clockwise and the film label moves counterclockwise or vice versa so that the film label wraps around the bottle.

The adhesive (e.g., hot-melt adhesive or LED-curable adhesive) strip or spot applied to the leading edge or the article to be labeled ensures a precise and positive transfer onto the rotating container. This adhesive ensures that the label is positioned precisely and glued correctly. As the container is rotating while the label is being applied, the label is wiped to wrap the article to be labeled. When the trailing edge with a narrow strip of LED-curable adhesive overlaps with the leading edge, a seamed label is formed over the article.

Figure 4:
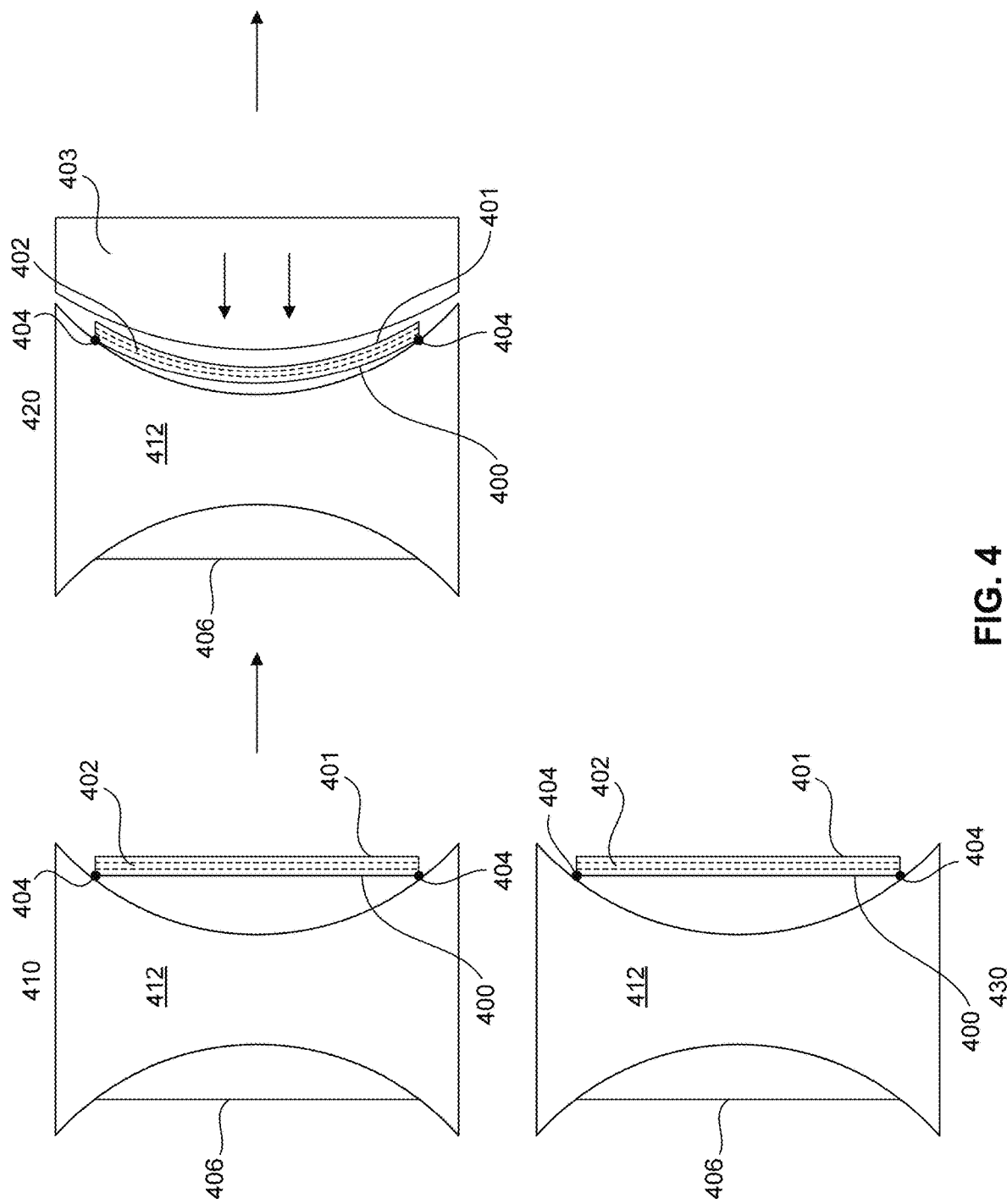
FIG. 4 shows an example of using a wiper to wipe the trailing edge against the article to be labeled to spread the adhesives disposed between the trailing edge and the leading edge.

In some embodiments, application of adhesive between leading and trailing edge is followed by a wiping step with a wiper to spread the adhesives. The wiper can be, for example, a brush, a sponge roller, a sponge pad, or other suitable device. Wiping the trailing edge can be performed using standard techniques in the art. For example, as shown in FIG. 4, a film label 406 is wrapped around an article 412 with an irregular shape and is treated with a wiper 403. First, the leading edge 400 of the film label 406 secures the label to the article through two co-planar attach points 404. While points 404 are illustrated as points in FIG. 4 for ease of illustration, they may occupy a larger space, for example areas of adhesive 110 and 120 as illustrated in FIG. 1A. The film label 406 then wraps around the article so that the trailing edge 401 overlaps with the leading edge 400 with trailing edge adhesive 402 disposed between leading edge 400 and trailing edge 401. Configuration 410 shows the result of this wrapping. In configuration 410, trailing edge adhesive 402 does not necessarily connect leading edge 400 and trailing edge 401 everywhere that trailing edge adhesive 402 is present along the seam. Next, wiper 403 can then be applied to wipe the leading edge 400 and trailing edge 401 against the article and spread trailing edge adhesive 402 (an LED-curable adhesive) between the overlaps of the leading edge and trailing edge. Configuration 420 shows wiper 403 wiping in this manner. For ease of illustration, configuration 420 shows spaces between wiper 403, the film label 406, and article 412. But, wiper 403 may wipe leading edge 400 and trailing edge 401 against article 412. Wiper 403 is subsequently removed, leading to configuration 430. Configuration 430 is different from configuration 410 because, in configuration 430, trailing edge adhesive 402 does connect leading edge 400 and trailing edge 401 everywhere that trailing edge adhesive 402 is present along the seam, as a result of the previous action of wiper 403.

In some embodiments, it is preferable that the adhesives are applied at or within 1 mm of the leading edge and/or the trailing edge so that the wiping does not cause the film label to lift. In some embodiments, the leading edge adhesive can be a mixture of polymers, including but not limited to hydrocarbons, modified rosin esters, polyamides, polyesters, waxes, and mineral oil. In some embodiments, the leading edge adhesive can be Henkel 493A or KIC 5003. In some embodiments, the leading edge adhesive is not LED curable.

Referring back to FIGS. 3A-3F, the articles with the seamed film label (e.g., shrink film label) then travel in the container table 303 through an LED station 309, which includes at least one LED light which emits light, for example, at a wavelength of 365 nm to 420 nm (e.g., 385 nm to 405 nm). The LED-curable adhesive exposed to the LED light can then be cured while passing through the LED station 309.

The LED station 309 may include at least one LED lamp that emits light at a wavelength of between 365 nm and 420 nm (e.g., 385 nm to 405 nm). In some embodiments, the at least one LED lamp (e.g., 1, 2, 3, 4, 5, 6, 7, 8, 9, or 10 lamps) can be installed downstream immediately after the labels are transferred onto the articles (e.g., bottles). The LED lamp(s) can be fixed on the non-rotating part of the container table 303 at positions downstream to where the containers in the container table 303 receive the labels from the vacuum drum 308. The LED lamp(s) can also be provided in a separate unit, not physically associated with the container table 303. The articles traveling in the container table 303 are exposed to the LED lights such that the LED curing process can label up to 720 (e.g., 50, 100, 150, 200, 300, 400, 500, 600, 700, 720, or any ranges between the specified values) articles per minute in a sequential manner.

The LED lamps may be operated at various power levels, such as between 50% and 100% e.g., 80% to 100%) of the LED lamp's maximum power level. In some embodiments, each LED lamp is operated at the same power level. In some embodiments, each LED lamp is operated at a power level independent of other LED lamps used in the process. In some embodiments, one or more LED lamps is operated at a power level of 80%. In some embodiments, one or more LED lamp is operated at a power level of 100%.

In addition to the number of LED lamps and the power level of those LED lamps, another factor that affects the adhesive cure is the amount of time that the adhesive is exposed to LED light. The amount of time that the adhesive is exposed to LED light may depend on the speed of rotation of container table 303. In some embodiments, the adhesive is exposed to LED light for 10 milliseconds (ms) or less per LED lamp in operation. In some embodiments, the adhesive is exposed to LED light for 2 ms to 6 ms per LED lamp in operation. In some embodiments, the adhesive is exposed to LED light for a total of 5 ms to 10 ms. As an example, in one machine running at 600 bottles per minute (bpm) with one LED light in operation, each bottle was exposed to LED light for about 2.4 ms.

The film label (e.g., shrink film label) wrapped containers then exit through an output unit 32, which may include a linear conveyor belt 311, an output distribution wheel 310, and a container table 303. The output distribution wheel 310, preferably a star wheel, rotating counter-wise with respect to the direction of rotation of the container table 303, receives the articles with LED-cured labels exiting the container table 303 and transfers them onto the conveyor belt 311. If shrink film labels are used, the conveyor belt 311 can bring the labeled articles into a heating station, such as an oven (not shown) or a shrink tunnel using, for example, steam or hot air, such as 312 as shown in FIG. 3F, which heat-shrinks the labels to wrap over the articles to conform to the shape of the container that the shrink film label surrounds.

Leading and/or Trailing Edge LED-Curable Adhesive

During application of a label to a bottle, the leading edge is initially attached to the bottle by liquid adhesive, i.e., by heated hot-melt adhesive, or by un-cured LED-curable adhesive. The label is wrapped around the bottle and the trailing edge is attached to the bottle. This wrapping happens at speeds of, for example, 600 bpm (bottles per minute). Eventually, the hot-melt adhesive cools and hardens, or the LED-curable adhesive is cured. But, the wrapping happens immediately after the liquid adhesive is applied.

In the embodiment described above with respect to FIG. 1, the leading edge adhesive was a hot-melt adhesive, and the trailing edge adhesive was an LED-curable adhesive. A hot-melt adhesive was used for the leading edge because previously existing LED-curable adhesives, in liquid form prior to LED curing, did not adhere sufficiently to the bottle to allow for processing at commercially desirable speeds, such as 600 bpm. But, it is desirable to use LED-curable adhesive for both the leading edge and trailing edge for two reasons.

First, LED-curable adhesives may have superior bond strength, and may decrease the failure rate of bottle labeling during shipping and storage after the label has been applied.

Second, using the same adhesive for the leading and trailing edges may simplify the equipment needed to apply liquid adhesive. For example, using LED-curable adhesive for both the leading and trailing edge removes the need for equipment to heat a hot-melt adhesive, and allows for work at ambient temperatures that are safer and more convenient for workers.

The inventors have surprisingly discovered that commercially desirable labeling speeds, such as 600 bpm, can be achieved using LED-curable adhesive for both the leading and trailing edges. LED-curable adhesives having an unusually high tack force and or viscosity in their liquid form prior to curing were used to achieve this desirable speed. In some embodiments, the LED-curable adhesive can have a tack force of at least 5 Newtons ("N"). In some embodiments, the LED-curable adhesive can have a tack force of at least 5 N, 6 N, 7 N, 8 N, 9 N, 10 N, 11 N, 12 N, 13 N, 14 N, 15 N, 16 N, 17 N, 18 N, 19 N, 20 N, 21 N, 22 N, 23 N, 24 N, 25 N, 26 N, 27 N, 28 N, 29 N, or 30 N, or any range having any two of these values as endpoints. In some embodiments, the LED-curable adhesive can have a viscosity of at least 2 Pascal seconds ("Pas") at 25° C. In some embodiments, the LED-curable adhesive can have a viscosity of at least 2 Pas, 3 Pas, 4 Pas, 5 Pas, 6 Pas, 7 Pas, 8 Pas, 9 Pas, 10 Pas, 15 Pas, 20 Pas, 25 Pas, 30 Pas, 35 Pas, 40 Pas, 45 Pas, 50 Pas, 55 Pas, 60 Pas, 65 Pas, 70 Pas, 75 Pas, 80 Pas, 85 Pas, 90 Pas, 95 Pas, or 100 Pas at 25° C., or any range having any two of these values as endpoints. Viscosity is a parameter that can depend on, for example, temperature and applied stress. As used herein, viscosity can be measured at a sufficiently high applied stress such that the fluid behaves like a Newtonian fluid. Unless otherwise specified, viscosities described herein are measured at a shear stress of 100 Pascales. While lower tack force and/or viscosity may be used, such use may result in undesirably lower labeling speeds to avoid leading edge detachment during the process of wrapping the label around the bottle.

There is often a positive correlation between the viscosity and the tack force of an LED-curable adhesive in liquid form higher viscosity may correlate with higher tack force. But, it is possible to modify tack force without modifying viscosity, or to modify tack force more significantly than viscosity.

While both tack force and viscosity may have an effect on how well a label attached, it is believed that tack force is more relevant. In some embodiments, a low viscosity combined with a high tack force may be desirable, as a too-high viscosity may slow adhesive application.

The viscosity and tack force values described herein are suitable for use with commercially available labeling systems. However, if mechanical improvements are made to labeling systems that allow for enhanced adhesion or bottling speed for any given adhesive, it may be possible to use an LED-curable adhesive having a lower viscosity or a lower tack force than described herein.

Non-Shrink Labels, Including Labels for Use with Carbonated Soft Drinks

Non-shrink labels may be used to wrap articles, including carbonated soft drink bottles. These labels may be clear or opaque, including white and metallized. It has been observed that the adhesive bonds formed during bottle labeling sometimes detach during shipping and storage. This issue is particularly acute, for example, when using a clear label on a plastic carbonated soft drink ("CSD") bottle, such as a polyethylene terephthalate (PET) bottle. Without being limited to any theories, it is believed that clear labels have lower surface energy than other labels, and opaque labels generally have greater surface energy than a clear label, which may enhance the ability of an adhesive to contact and adhere to a label surface. So, clear labels may adhere less well than a comparable opaque label. CSD bottles may expand due to carbonation, particularly if shaken or dropped. This combination of bottle expansion and smooth labels may lead to a higher than usual rate of labels detaching during shipping and storage. Label failure may occur in other contexts as well, such as opaque labels and/or bottles that are not CSD. The superior bond strength of LED-curable adhesives relative to hot-melt adhesives may reduce this failure rate in a commercially significant manner. Any suitable label material may be used, including polyolefin, polyester and other materials, whether clear or opaque.

LED-Curable Adhesive

LED lamps are very compact and, unlike ultraviolet (UV) lamps, LED lamps do not generate ozone, they generate less heat, and they do not require ventilation or sophisticated shielding because they emit light only in the near visible range of spectra –365 nanometers nm) and higher.

In contrast, using UV-curable adhesives for sealing labels is not desirable for application in shrink film labeling. UV lamps generate a significant amount of heat, which can be detrimental to stability of the label. UV lamps also produce ozone and a significant amount of UV light in a very low spectral range, for example as low as 200 nm, which can be harmful to eyes. Installation of such lamps on the existing labeling machines would require significant modifications in design, ventilation of ozone, and efficient shielding of UV light. Further, LED-curable adhesives have few if any volatile organic compounds, which makes them preferable to other seam-making processes, such as UV curing or solvent weld.

The latest generation of LED lamps is capable of emitting high-intensity monochromatic light in the near visible range of light spectra. An adhesive composition that can absorb light in the same spectral range therefore can undergo rapid crosslinking/polymerization, for example, in less than a second. Moreover, the LED curing can be done through a semi-transparent (or even visibly opaque) layer of printing ink that can transmit a sufficient amount of light in 365 nm to 420 nm (e.g., 385 nm to 405 nm) spectral range. For example, for visibly opaque materials, sub-visible LED light (i.e., light at a wavelength below 400 am, such as 395 nm) may still pass through the label to cure the LED-curable adhesive.

LED curing has been considered to be much slower than UV curing due to excessive oxygen inhibition that slows down polymerization rate. It was not considered as suitable for high-speed applications such as bottle labeling, which preferably occurs at a speed of 600 bottles/minute and up to 720 bottles/minute. However, the present inventors found that the curing speed of the film wrapped around the article to be labeled (e.g., a bottle) can meet the high speed requirements of a typical labeling application, with the LED-curable adhesive cured in the seam between two layers. While not wishing to be bound by theory, it is believed that the curing speed with LED light increases significantly due to the anaerobic, oxygen free conditions in between two layers of the film.

Further, the LED-curable adhesives may be used effectively on various types of labels, including clear and visibly opaque labels. The transmission of regular intensity LED light (e.g., light with an irradiance below 5 W/cm$^2$) through a clear label may be 50% to 100% transmission (e.g. 80% or higher). The transmission of regular intensity LED light through a white label may be 0% to 30% (e.g. 1% or less). The transmission of regular intensity LED light through a metallized label may be 0% to 5% (e.g. 0%). Even if visible light is not capable of penetrating a white or metallized label, sub-visible light, for example high-intensity 395 nm LED light, may be capable of penetrating through these opaque labels. High-intensity light may have a high irradiance, for example greater than 5 W/cm$^2$ (e.g., at least 10 W/cm$^2$). For example, in some embodiments high-intensity 395 nm LED lamps may be used, producing LED light having a peak irradiance of 10 W/cm$^2$ or higher. In some embodiments, high intensity 395 nm lamps may be used, producing LED light having a peak irradiance of 20 W/cm$^2$.

Suitable LED-curable adhesives for use in the methods described herein can be characterized by one or more of the following: (1) a suitable application viscosity (e.g., about 0.3 Pas (300 cps) to about 2 Pas (2000 cps), or less than 1 Pas (1000 cps), less than 0.8 Pas (800 cps), or less than 0.6 Pas (600 cps) at temperature below 70° C. (e.g., below 50° C.), and/or the viscosities and tack forces described above; (2) a curing speed with LED suitable for labeling up to 720 (e.g., 50, 100, 150, 200, 300, 400, 500, 600, 700, 720, or any ranges between the specified values) articles per minute in a sequential manner; and (3) a bonding strength (after LED cured) for the intended use, such as a bonding strength sufficient for a shrink film a to remain bonded under heat, such as in the shrink tunnel at 100° C., or for shrink and non-shrink films to remain bonded during shipping, storage and handling.

In some embodiments, the LED-curable adhesive is a mixture of ethylenically unsaturated pre-polymers, ethylenically unsaturated oligomers, ethylenically unsaturated monomers, photoinitiators with light absorptivity in close proximity and within LED range of 385 nm to 405 nm, and optionally one or more inert compatible fillers.

In preferred embodiments, the LED-curable adhesive is a mixture of acrylate or methacrylate functional polyurethane, acrylate or methacrylate functional monomer, phosphine oxide type photoinitiator with light absorptivity in close proximity and within LED range of 385 nm to 405 nm, and optionally one or more inert compatible fillers, wherein the one or more inert fillers are hydrocarbon resins, rosin esters, polyamides, polyesters or a combination thereof.

In some specific embodiments, the LED-curable adhesive can have a composition according to the following table:

| Components | Suppliers | Adhesive 1 % | 2 % | 3 % | 4 % | 5 % | 6 % |
|---|---|---|---|---|---|---|---|
| CN973J75 | Arkema ® | 66.5 | 66.5 | | 76.5 | 59.5 | |
| CN966J75 | Arkema ® | | | 66.5 | | | 36.5 |
| Foral ™ 85E | Eastman ® | | | | | 15 | 30 |
| SR350 | Arkema ® | | 30 | | | | |
| SR506 | Arkema ® | | | | 22 | 23 | 30 |
| Irgacure ® TPO | BASF ® | | 3 | | | | 3 |
| Irgacure ® 819 | BASF | 2 | | | 1 | 2 | |
| Bisomer ® PEG 200MA | GEO ® Specialty Chemicals | 32 | | | | | |
| Genorad ® 16 | Rahn | 0.5 | 0.5 | 0.5 | 0.5 | 0.5 | 0.5 |
| Total | | 101 | 100 | 67 | 100 | 100 | 100 |

The amount of LED-curable adhesive on the film label (e.g., shrink film label) can be generally in an amount of between 5 g/m$^2$ and 50 g/m$^2$ (e.g., 10 g/m$^2$, 20 g/m$^2$, 30 g/m$^2$, 40 g/m$^2$, 50 g/m$^2$, or any ranges between the specified values). In preferred embodiments, the amount of LED-curable adhesive is in an amount of between 5 g/m$^2$ and 30 g/m$^2$ or between 10 g/m$^2$ and 30 g/m$^2$. While not wishing to be bound by theories, it is believed that because the LED-cured adhesive has a higher bonding strength and a lower sensitivity to elevated temperature, it can be applied at a much lower coat weight than conventional hot-melt adhesive, which is generally applied at a coat weight of 80-100 g/m$^2$ in shrink film applications. Thus, using LED-curable adhesive can result in significant savings of the adhesive cost.

LED-curable adhesive can be applied on the film label (e.g., shrink film label) at various temperatures below typical shrink temperature. In preferred embodiments, the LED-curable adhesive is applied on the film label (e.g., shrink film label) at a temperature of less than 70° C., such as less than 50° C., less than 40° C., less than 30° C., or at ambient temperature.

The LED-curable adhesive is generally cured after the film label (e.g., shrink film label) has been transferred onto the article to be labeled. Various LED lamps can be used and are known in the art. In preferred embodiments, the LED lamps generate LED lights having a wavelength of between 365 nm and 420 nm (e.g., between 385 nm and 405 nm (e.g., at 395 nm)).

Tackifier Resin Screening

As shown in the following table, varying tack force can be achieved for LED-curable adhesive blends by combining different rosins or resins with monomer and diluent:

| | Components | | Blends, % | | | | | | |
|---|---|---|---|---|---|---|---|---|---|
| Code | Type | Softening Temp. (° C.) | B1 | B2 | B3 | B4* | B5* | B6 | B7* |
| R1 | Modifier rosin | 115 | 50 | | | | | | |
| R2 | Hydrogeneated rosin | 85 | | 50 | | | | | |
| R3 | Hydrogeneated rosin | 105 | | | 50 | | | | |
| R4 | Polyterpene resin | 115 | | | | 50 | | | |
| R5 | Polyterpene resin | 135 | | | | | 50 | | |
| R6 | Polyester resin | 100 | | | | | | 50 | |
| R7 | Polyester resin | 85 | | | | | | | 50 |
| M1 | Monomer/diluent | | 50 | 50 | 50 | 50 | 50 | 50 | 50 |
| | Total | | 100 | 100 | 100 | 100 | 100 | 100 | 100 |
| | Tack Force (N) | | 49 | 1.45 | 6.65 | N/A | N/A | 6.79 | N/A |

*These resins were not soluble or compatible with selected monomer.

As shown in the table, a blend with modifier rosin and monomer/diluent achieved a tackiness of 49 N. Blends having a combination of polyterpene resin and monomer/diluent were not soluble or compatible with the monomer.

were control adhesives. The overall profile metric includes properties such as tack force, bond strength, and viscosity. The following table shows tack force values for various adhesives, where the weight was lifted at the fast rate.

| Blends | C1 | C2 | B8 | B9 | B10 | B11 | B12 | B13 | B14 | B15 | B16 | B17 | B18 |
|---|---|---|---|---|---|---|---|---|---|---|---|---|---|
| Viscosity at 25° C. (Pas) | 9.4 | 12.4 | 79.3 | 49.5 | 6.47 | 31.1 | 12.6 | 48.0 | 17.2 | 10.5 | 10.8 | 33.8 | 47.1 |
| Predicted Bond strength v. C1 and C2 | | | equal | equal | worse | worse | better | worse | equal | worse | worse | equal | equal |
| Tack Force (N) | 8.8 | 14.1 | 17.5 | 22.9 | 14.0 | 14.0 | 14.1 | 19.0 | 16.9 | 15.7 | 15.5 | 17.8 | 18.7 |
| Tack Force (N/cm$^2$) | 1.9 | 3.1 | 3.9 | 5.1 | 3.1 | 3.1 | 3.1 | 4.2 | 3.7 | 3.5 | 3.4 | 3.9 | 4.1 |
| STDev | 1.8 | 1.9 | 3.8 | 5.1 | 1.0 | 0.7 | 3.3 | 1.8 | 2.8 | 2.0 | 1.2 | 1.6 | 1.4 |
| Increase in Tack Force v. C2 (%)) | | | 19.5 | 22.2 | | | 0.0 | | 16.3 | | | 12.7 | 17.1 |
| Overall v. C1 and C2 | | | equal | better | | | equal | | equal | | | equal | better |

Tack Force Testing

Testing was conducted to determine the tack force of various LED-curable adhesive blends. To conduct the tests, a specific adhesive blend was applied with a Bird applicator over a metal platform in an amount to produce a 5 mil/125 micron adhesive thickness. A 50 g cylindrical weight with a diameter of 24 mm and a 452 cm$^2$ area of contact was attached to a force gauge and the weight was lowered onto the adhesive layer and allowed to sit on the surface for about 10 s. The weight was then lifted from the adhesive layer at two rates. The fast rate was about 1 mm/s and the slow rate was about 0.1 mm/s. The force gauge recorded peak force achieved during release of the weight from the adhesive. That peak force is the "tack force." Unless otherwise specified, tack force values herein are measured where the weight is lifted at the fast rate.

Tack force can be dependent on adhesive formulation and viscosity, as well as the speed and/or acceleration of lifting the weight from the adhesive surface. Samples C1 and C2

As shown in the table, blends B8, B9, B12, B14, B17, and B18 had equal or better predicted bond strength as compared to the control C1 and C2 blends. Each of these blends had better predicted bond strength compared to hot-melt adhesive systems. Predicted bond strength is based on how difficult it is to peel off LED-cured labels from several bottles for each composition. The experimental setup used to adhere the labels for this test may result in minor variations in parameters such as adhesive thickness that affect how difficult it is to peel. These minor variations make exact quantification of bond strength difficult, which is why the bond strength is characterized as "predicted." But, the experimental setup is adequate to provide reasonably good information as to whether the bond strength of a particular adhesive is expected to be worse than, equal to, or better than a control sample. And all of the samples in the table above had bond strengths better than a typical hot-melt adhesive. As shown in the table, blends B9 and B18 provided an overall better profile than control samples C1 and C2.

The following table shows tack force values for various adhesives, where the weight was lifted at the slow rate.

|  | C1 | C2 | B9 | B18 |
|---|---|---|---|---|
| Tack Force (N) | 22.2 | 21.3 | 25.6 | 27.1 |
| Tack Force (N/cm$^2$) | 4.9 | 4.7 | 5.7 | 6.0 |
| STDev | 1.4 | 3.2 | 5.1 | 3.1 |
| Increase in Tack Force v. C2 (%) |  |  | 16.8 | 21.1 |

Retrofit Apparatus from Hot-Melt Labeling Machine

Traditional hot-melt adhesives dominate the labeling market, which is not using highly temperature sensitive shrink films. A vast majority of shrink film labels are sealed with help of organic solvents and require separate equipment for both forming the sleeve and applying it to the bottle. Introducing shrink film labels for a new generation of beverage packaging would require significant investment in the traditional shrink sleeve labeling equipment and replacing existing hot-melt labeling machines at many plants. However, introduction of novel LED curing technology, which has never been used in the labeling industry, allows for retrofitting of existing hot-melt equipment with minimal investment required to purchase and install LED lamps, saving significant money.

By using the LED technology, the labeling machine for the methods described herein can be a retrofit apparatus from an existing hot-melt labeling machine, e.g., Krones® Contiroll labeling machine. Almost any existing hot-melt labeling machine can be retrofit into the apparatus described herein by installing an LED station comprising at least one LED lamp configured to cure the LED-curable adhesive disposed in the overlap between the leading and trailing edges of the shrink film label. See e.g., FIGS. 3A-3F as described herein above. For example, the at least one LED lamp (e.g., 1, 2, 3, 4, 5, 6, 7, 8, 9, or 10 lamps) can be installed downstream immediately after the labels are transferred onto the articles (e.g., bottles). The LED lamp(s) can be fixed on the non-rotating part of the labeling machine at positions downstream to where the containers wrapped by the labels. The LED lamp(s) can also be provided in a separate unit, not physically associated with the labeling machine. In some embodiments, the existing hot-melt labeling system is one of the Krones® Contiroll labeling system or the like.

LED lamps can be installed on all existing labeling machines as an add-on without modifications to the existing labeling machines such as a Krones® Contiroll labeling machine. Installation of LED lamps on the existing labeling equipment has been done such that current hot-melt labeling machines used in manufacturing of bottles (e.g., plastic sports drink or other soft drink bottles) can be converted into shrink film labeling machines.

The LED adhesive applicator can be retrofitted from the hot-melt adhesive applicator and configured to apply LED-curable adhesive. In some embodiments, the heater for applying hot-melt adhesive is removed from the hot-melt labeling system. In some embodiments, the heater is not removed, but can be simply turned off when applying the LED-curable adhesive. In some embodiments, two different types of adhesive are applied to the leading edge and trailing edge. In such embodiments, the existing hot-melt adhesive applicator is removed and replaced with two adhesive applicators, see e.g., FIG. 3C, applicators 307A and 307B. One of the applicators is suited to apply a leading edge adhesive, such as LED-curable or hot-melt adhesive, near the leading edge of the shrink film label; and the other is suited to apply a trailing edge adhesive including an LED-curable adhesive near the trailing edge of the shrink film label. Other suitable adhesive applicator designs may be used, for example those shown in FIGS. 3A-3F.

Various performance tests were completed to test the effectiveness of using LED-cured adhesives. Testing was completed using three different LED-curable adhesives, Sample A, Sample B, and Sample C. The results of the performance tests are described in the Examples below.

Example 1—Hot-Melt Adhesive

A control test was run using a hot-melt adhesive. The hot-melt adhesive was used for both the leading edge and trailing edge adhesive. A heater was used to raise the temperature of the adhesive to 290° F., no LED lamps were used in the control experiments. After heating, the adhesive was cooled to bond the leading edge and trailing edge of the label.

| Run | No. of LED Lamps | Type of Label | Run Temperature | Wrapping Speed (bpm) | Peel Bond Strength (lb) | Shear Bond Strength (lb) |
|---|---|---|---|---|---|---|
| 1 | 0 | Metallized | 290° F. (143° C.) | 600 bpm | 4.33 | 20 |
| 2 | 0 | Clear | 290° F. (143° C.) | 600 bpm | 5.37 | 19.99 |
| 3 | 0 | White | 290° F. (143° C.) | 400 bpm | 4.55 | 19.75 |

Example 2—Transmission and Opacity Measurements

The opacity of clear, white, and metallized labels were tested on the front surface of the labels, in an area without any markings or printing, using A2 illuminant and 2° observer angle using the entire spectrum from 400 nm to 700 nm. For each type of label, the opacity of 10 different samples was measured. The clear, white, and metallized labels had an average opacity of 17.6%, 83 and 100%, respectively.

The transmission of regular intensity light through clear, white, and metallized labels was measured at 395 nm using a UV-Vis spectrophotometer. Light transmission through the clear, white, and metallized labels was 86%, 0.3%, and 0%, respectively. Test results, for example those discussed in Examples 3-5, indicate that significantly higher transmission rates can be achieved with white and metallized labels if a high intensity monochromatic LED light source is used to cure the adhesives. For example, LED lamps having a peak irradiance of 20 W/cm$^2$ were used during the testing discussed in Examples 3-5.

Example 3—LED-Curable Adhesive Sample A

LED-curable adhesive Sample A was used for both the leading edge adhesive (pickup adhesive) and the trailing edge adhesive (lap adhesive). The table below shows the results of various process configurations for wrapping bottles using LED-curable adhesive Sample A. To test the peel bond strength and shear bond strength of adhesive Sample A, various modifications were made to the process parameters. Variables modified throughout the runs included number of LED lamps used to cure the adhesive, label type, temperature, lamp position, and wrapping speed. For each run listed in the table below, both the leading edge adhesive and the trailing edge adhesive cured. A heater was used to raise the temperature to the temperature indicated in the table below.

In the non-modified lamp position, one or more LED lamps were located at the LED station, described above. Runs 5, 6, 9, 10, and 13-20 were run with the LED lamps in the modified setup as described above. The lamp setup was modified for several runs. In the modified lamp setup, one LED lamp was positioned to apply LED light to the adhesive at the point where the label started to wrap around the bottle.

For a bottle wrapped in a clear label, the process achieved a wrapping speed of 600 bpm using 2 and 4 LED lamps. For a bottle wrapped in a white label, the process achieved a wrapping speed of 600 bpm using 1, 3, and 4 LED lamps. For a bottle wrapped in a metallized label, the process achieved a wrapping speed of 400 bpm using 2 and 4 LED lamps.

A lower wrapping speed exposes the bottles to the LED light for longer periods of time. Comparing run 1 with runs 2 and 3, the higher peel bond strength in run 1 indicates exposure time to LED light affects the peel bond strength. For example, a longer exposure time, or a higher LED energy output can result in improved peel bond strength.

Similarly, comparing runs 16 through 20, the only variable adjusted was the wrapping speed. Runs 16 through 20 show a trend of decreasing peel bond strength and shear bond strength as the wrapping speed increases (and thus exposure time to LED light decreases)

For a bottle wrapped in a clear label, the process achieved a wrapping speed of 600 bpm using 1, 2, and 4 LED lamps. For a bottle wrapped in a white label, the process achieved a wrapping speed of 275 bpm using 2 and 4 LED lamps. For each run listed in the table below, both the leading edge adhesive and the trailing edge adhesive cured.

| Run | No. of Lamps | Label Type | Temp. (° F.) | Wrapping Speed (bpm) | Peel Bond Strength (lb) | Shear Bond Strength (lb) |
|---|---|---|---|---|---|---|
| 1 | 2 | Clear | 140 | 500 | 5.38 | 20.00 |
| 2 | 2 | Clear | 140 | 600 | 3.86 | 20.00 |
| 3 | 2 | Clear | 150 | 600 | 3.97 | 20.00 |
| 4 | 1 | Clear | 150 | 600 | 0.92 | 12.56 |
| 5 | 4 | Clear | 150 | 600 | 1.95 | 19.30 |
| 6 | 4 | White | 150 | 200 | 1.76 | 19.48 |
| 7 | 4 | White | 150 | 275 | 1.60 | 19.17 |
| 8 | 2 | White | 150 | 275 | 0.37 | 18.20 |

Example 5—LED-Curable Adhesive Sample C

LED-curable adhesive Sample C was used for both the leading edge adhesive and the trailing edge adhesive. The table below shows the results of various process configurations for wrapping bottles using LED-curable adhesive

| Run | No. of Lamps | Label Type | Temp. (° F.) | Modified Lamp Position | Wrapping Speed (bpm) | Peel Bond Strength (lb) | Shear Bond Strength (lb) |
|---|---|---|---|---|---|---|---|
| 1 | 2 | Clear | 130 | no | 300 | 2.64 | 18.53 |
| 2 | 2 | Clear | 130 | no | 600 | 2.15 | 19.33 |
| 3 | 2 | Clear | 130 | no | 600 | 2.21 | 18.47 |
| 4 | 4 | Clear | 130 | no | 600 | 1.88 | 17.44 |
| 5 | 1 | White | 140 | yes | 600 | 0.65 | 9.69 |
| 6 | 1 | White | 140 | yes | 600 | 0.88 | 10.62 |
| 7 | 2 | White | 130 | no | 500 | 0.42 | 18.64 |
| 8 | 3 | White | 130 | no | 300 | 1.63 | 19.79 |
| 9 | 3 | White | 130 | yes | 500 | 1.22 | 15.47 |
| 10 | 3 | White | 140 | yes | 600 | 0.92 | 14.85 |
| 11 | 4 | White | 130 | no | 500 | 1.60 | 20.00 |
| 12 | 4 | White | 130 | no | 500 | 1.43 | 19.89 |
| 13 | 4 | White | 140 | yes | 600 | 1.09 | 16.71 |
| 14 | 4 | White | 140 | yes | 600 | 1.32 | 18.07 |
| 15 | 2 | Metallized | 140 | yes | 400 | 0.87 | 12.92 |
| 16 | 4 | Metallized | 140 | yes | 100 | 2.57 | 20.00 |
| 17 | 4 | Metallized | 140 | yes | 200 | 2.14 | 18.09 |
| 18 | 4 | Metallized | 140 | yes | 300 | 1.88 | 16.42 |
| 19 | 4 | Metallized | 140 | yes | 400 | 1.54 | 13.94 |
| 20 | 4 | Metallized | 140 | yes | 400 | 0.96 | 13.51 |

Example 4—LED-Curable Adhesive Sample B

LED-curable adhesive Sample B was used for both the leading edge adhesive and the trailing edge adhesive. The table below shows the results of various process configurations for wrapping bottles using LED-curable adhesive Sample B. To test the peel bond strength and shear bond strength of adhesive Sample B, various modifications were made to the process parameters. Variables modified throughout the runs include number of LED lamps used to cure the adhesive, label type, temperature, and wrapping speed. A heater was used to raise the temperature to the temperature indicated in the table below.

Sample C. To test the peel bond strength and shear bond strength of adhesive Sample C, various modifications were made to the process parameters. Variables modified throughout the runs included number of LED lamps used to cure the adhesive, label type, temperature, and wrapping speed. A heater was used to raise the temperature to the temperature indicated in the table below.

For a bottle wrapped in a clear label, the process achieved a wrapping speed of 600 bpm using 1, 2, and 4 LED lamps. For a bottle wrapped in a white label, the process achieved a wrapping speed of 275 bpm using 2 and 4 LED lamps. For each run listed in the table below, both the leading edge adhesive and the trailing edge adhesive cured.

| Run | No. of Lamps | Label Type | Temp. (° F.) | Wrapping Speed (bpm) | Peel Bond Strength (lb) | Shear Bond Strength (lb) |
|---|---|---|---|---|---|---|
| 1 | 1 | Clear | 160 | 600 | 0.97 | 13.77 |
| 2 | 2 | Clear | 150 | 600 | 2.09 | 20.00 |
| 3 | 2 | Clear | 160 | 600 | 2.12 | 19.54 |
| 4 | 4 | Clear | 160 | 600 | 1.95 | 18.54 |
| 5 | 2 | White | 160 | 275 | 0.73 | 19.98 |
| 6 | 4 | White | 160 | 275 | 1.57 | 19.68 |

As shown in Examples 3-5, peel bond strength and shear bond strength generally increased as more LED lamps were added to the process and decreased as wrapping speed increased. Further, the results show that peel bond strength generally decreases as opacity increases. For clear labels generally have a higher bond strength than white labels, and white labels generally have a higher bond strength than metallized labels.

Further, comparing the data from the hot-melt adhesives in Example 1 and the LED-curable adhesives of Examples 3-5, the tests done with the LED-curable adhesives achieved the same wrapping speed as the hot-melt adhesives and exhibited similar peel bond strength and shear bond strength. However, tests in Examples 3-5 were completed at much lower temperatures than the hot-melt in Example 1 (130-160° F. compared to 290° F. in the hot-melt example).

Example 6—Drop Testing

The chilled Bruceton test method was used to test the strength of the adhesive bonds. After wrapping the bottles, the bottles were dropped from incremental heights, starting at a height of 60 inches, increasing in increments of 6 inches, to a height of 84 inches. A bottle passed the Bruceton test at a given height if, after being dropped, the label remained on the bottle and the adhesive bond did not break. A bottle failed the Bruceton test at a given height if, after being dropped, the label fell off of the bottle or one or more adhesive bonds broke.

For labels that had been cured by a hot-melt procedure, the labels passed the Bruceton test at all heights from 60 inches to 84 inches. Similarly, for labels that had been cured by the LED-curing method described above, the labels passed the Bruceton test at all heights from 60 inches to 84 inches. Thus, the LED-curing method proved to be at least as effective as the hot-melt curing method.

Example 7—Viscosity Measurements

Viscosity of the adhesives of Examples 3-5 was measured at various temperatures to determine the optimum viscosity range for effectively curing the adhesives using the LED curing method described above. It was determined that a range of 1 Pas (1000 cps) to 1.3 Pas (1300 cps) resulted in effective curing of the LED-curable adhesive on both the leading edge and trailing edge of the label. Viscosity was measured for each adhesive at temperatures ranging from 50° C. (122° F.) to 70° C. (158° F.).

The adhesive of Example 3 had a viscosity in the range of 1 Pas (1000 cps) 1.3 Pas (1300 cps) in the temperature range of about 55° C. to about 60° C. The adhesive of Example 4 had a viscosity in the range of 1 Pas (1000 cps) to 1.3 Pas (1300 cps) in the temperature range of about 65° C. to about 60° C. The adhesive of Example 5 had a viscosity of in the range of 1.2 Pas (1200 cps) 1.3 Pas (1300 cps) in the temperature range of about 68° C. to the testing limit of 70° C. All three adhesives have a viscosity in the range of 1 Pas (1000 cps) to 1.3 Pas (1300 cps) at temperatures higher than the average daily temperature of the hottest typical filling plants.

| Sample A | | | | | | | | | | | | | |
|---|---|---|---|---|---|---|---|---|---|---|---|---|---|
| Temp. (° C.) | | | | | | | | | | | | | |
| 54.5 | 55.0 | 55.5 | 55.9 | 56.4 | 56.8 | 57.3 | 57.8 | 58.3 | 58.7 | 59.2 | 59.6 | 60.1 | 60.5 |
| Visc. (Pas) 1.36 | 1.32 | 1.28 | 1.25 | 1.22 | 1.18 | 1.15 | 1.12 | 1.09 | 1.06 | 1.04 | 1.01 | 0.98 | 0.96 |

| Sample B | | | | | | | | | | | |
|---|---|---|---|---|---|---|---|---|---|---|---|
| Temp. (° C.) | | | | | | | | | | | |
| 64.5 | 64.9 | 65.4 | 65.9 | 66.4 | 66.8 | 67.3 | 67.7 | 68.2 | 68.6 | 69.1 | 69.6 |
| Visc. (Pas) 1.36 | 1.32 | 1.27 | 1.23 | 1.19 | 1.15 | 1.12 | 1.08 | 1.05 | 1.02 | 0.96 | 0.95 |

| Sample C | | | |
|---|---|---|---|
| Temp. (° C.) | | | |
| 68.1 | 68.6 | 69.1 | 69.5 |
| Visc. (Pas) 1.35 | 1.31 | 1.27 | 1.24 |

The viscosity of the adhesive is an important factor because the viscosity of the adhesive affects adhesive application. A viscosity that is too high may slow adhesive application and may reduce the amount of adhesive transferred. In some embodiments, a low viscosity combined with a high tack force may be desirable, and the data shown above indicates that it is possible to maintain a relatively low viscosity at temperature ranges that are effective for LED-curable adhesives.

Example 8—Testing at Elevated Temperatures

Several label samples were tested for shear bond strength at 22° C. and at 95° C. using both hot-melt adhesives and LED-curable adhesives. The table below summarizes bond strength of both hot-melt adhesives and LED-curable adhesives at 22° C., and 95° C., including the percentage decrease of bond strength at the elevated temperature compared to the lower temperature. As shown in the table below, all hot-melt samples saw a 99% decrease in bond strength. In contrast, the bond strength for LED-curable adhesives decreased by 82% to 91%,

| Sample | Label Type | Adhesive Type | Shear Bond Strength (lb) at 22° C. | Shear Bond Strength (lb) at 95° C. | Percent Decrease |
|---|---|---|---|---|---|
| 1 | clear | hot-melt | 11.28 | 0.11 | 99% |
| 2 | white | hot-melt | 13.18 | 0.15 | 99% |
| 3 | metal | hot-melt | 12.87 | 0.18 | 99% |
| 4 | clear | LED | 15.93 | 1.39 | 91% |
| 5 | clear | LED | 13.12 | 2.31 | 82% |
| 6 | clear | LED | 14.53 | 1.75 | 88% |
| 7 | white | LED | 15.57 | 2.29 | 85% |
| 8 | white | LED | 11.50 | 1.78 | 85% |
| 9 | white | LED | 14.54 | 1.83 | 87% |
| 10 | white | LED | 13.51 | 1.40 | 90% |
| 11 | metal | LED | 11.90 | 1.50 | 87% |

As the data above shows, even at elevated temperatures, LED-curable adhesives maintain bond strength. Such an ability to maintain bond strength at higher temperatures could be useful in several applications, for example CSD packaging, that is exposed to a wide range of temperatures. CSD packaging may be exposed to hot and humid conditions while in storage, for example in a garage or warehouse, room temperature conditions, for example in a retail store, and cold temperature conditions, for example while being stored in a refrigerator.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

All of the various aspects, embodiments, and options described herein can be combined in any and all variations.

All publications, patents, and patent applications mentioned in this specification are herein incorporated by reference to the same extent as if each individual publication, patent, or patent application was specifically and individually indicated to be incorporated by reference.

What is claimed is:

1. A method of preparing a labeled bottle, the method comprising:
    applying an LED-curable adhesive on at least a portion of a film label to be applied to a bottle;
    wrapping the film label around the bottle such that the leading and trailing edges of the film label overlap, wherein at least portions of the LED-curable adhesive are disposed in the overlap between the leading and trailing edges; and
    curing the LED-curable adhesive disposed in the overlap between the leading and trailing edges by exposing the LED-curable adhesive to LED light for 10 milliseconds or less,
    wherein the LED-curable adhesive is cured at a temperature below 70° C.

2. The method of claim 1, wherein the film label is a shrink film label.

3. The method of claim 2, further comprising passing the wrapped bottle through a shrink tunnel to form a shrink-film-labeled bottle.

4. The method of claim 1, wherein the bottle is characterized by a body comprising at least two parts having different diameters or dimensions.

5. The method of claim 4, wherein the film label wraps at least a portion of the bottle between and including the two different parts having different diameters or dimensions.

6. The method of claim 1, wherein the LED-curable adhesive is applied near the trailing edge of the film label.

7. The method of claim 6, further comprising applying a leading edge adhesive near the leading edge of the shrink film label.

8. The method of claim 7, wherein the leading edge adhesive is LED curable.

9. The method of claim 8, wherein at least a portion of the leading edge adhesive is disposed between the bottle and the leading edge, and wherein the method further comprises curing the leading edge adhesive disposed between the bottle and the leading edge.

10. The method of claim 9, wherein the leading edge adhesive disposed between the bottle and the leading edge is cured simultaneously with the LED-curable adhesive disposed in the overlap between the leading and trailing edges.

11. The method of claim 1, wherein the LED-curable adhesive is applied on the film label in an amount from 5 g/m$^2$ to 50 g/m$^2$.

12. The method of claim 1, wherein curing the LED-curable adhesive comprises subjecting the bottle to LED light at a wavelength of between 365 nm and 420 nm.

13. The method of claim 1, wherein the LED-curable adhesive is a mixture of ethylenically unsaturated prepolymers, ethylenically unsaturated oligomers, ethylenically unsaturated monomers, photoinitiators with light absorptivity in close proximity and within LED range of 385 nm to 405 nm, and optionally one or more inert, compatible fillers.

14. The method of claim 1, wherein the LED-curable adhesive is a mixture of acrylate or methacrylate functional polyurethane, acrylate or methacrylate functional monomer, phosphine oxide type photoinitiator with light absorptivity in close proximity and within LED range of 385 nm to 405 nm, and optionally one or more inert compatible fillers, wherein the one or more inert fillers are hydrocarbon resins, rosin esters, polyamides, polyesters or a combination thereof.

15. The method of claim 1, wherein the LED-curable adhesive is cured at a rate suitable for labeling 500-720 bottles per minute in a sequential manner.

16. The method of claim 1, wherein the film label is a non-shrink film label.

17. The method of claim 1, wherein the LED-curable adhesive has a tack force of at least 5 N.

18. The method of claim 1, wherein the LED-curable adhesive has a viscosity of at least 2 Pas at 25° C.

19. The method of claim 1, wherein the film label is a clear label.

20. The method of claim 1, wherein the film label is an opaque label.

21. The method of claim 1, wherein the bottle is a carbonated soft drink bottle.

22. The method of claim 1, wherein the leading edge adhesive is applied at a temperature below 70° C.

23. The method of claim 1, wherein the LED-curable adhesive contains no volatile organic compounds.

24. The method of claim 1, wherein the overlap between the leading and trailing edges of the film provides anaerobic conditions in which the LED-curable adhesive are cured.

25. The method of claim 1, wherein the LED light is a high intensity monochromatic light.

26. The method of claim 1, further comprising labeling bottles at a rate of 500-720 per minute.

27. The method of claim 7, wherein the LED-curable adhesive and the leading edge adhesive are applied at the same time.

28. The method of claim 1, wherein the curing is done using one LED lamp.

29. A method of labeling bottles, the method comprising:
adhering leading edges of labels to bottles;
applying an adhesive to the labels in overlap areas of the labels, wherein the overlap areas are areas between leading and trailing edges of the labels when the labels are wrapped around the bottle;
wrapping the labels around the bottles such that the adhesive is disposed between overlapping portions of the labels;
curing the adhesive of each bottle sequentially by subjecting the adhesive to LED light from a single LED lamp for 10 milliseconds or less at a temperature below 70° C.

30. The method of claim 29, wherein the method produces labeled bottles sequentially at a rate of 500 bottles per minute to 720 bottles per minute.

31. The method of claim 29, wherein the curing comprises subjecting the adhesive to LED light from the single LED lamp for 2 milliseconds to 6 milliseconds.

32. The method of claim 31, wherein the bottles are labeled sequentially at a rate of 600 bottles per minute to 720 bottles per minute.

33. The method of claim 32, wherein the adhesive on each label is exposed to LED light from the LED lamp for about 2.4 milliseconds.

* * * * *